(12) United States Patent
Kim et al.

(10) Patent No.: US 12,464,267 B2
(45) Date of Patent: Nov. 4, 2025

(54) IMAGE SENSOR AND CAMERA MODULE INCLUDING THE SAME

(71) Applicant: SAMSUNG ELECTRONICS CO., LTD., Suwon-si (KR)

(72) Inventors: Daeyun Kim, Suwon-si (KR); Hoyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 18/614,416

(22) Filed: Mar. 22, 2024

(65) Prior Publication Data

US 2024/0323571 A1    Sep. 26, 2024

(30) Foreign Application Priority Data

Mar. 24, 2023 (KR) ................ 10-2023-0039131
Apr. 14, 2023 (KR) ................ 10-2023-0049579

(51) Int. Cl.
*H04N 25/76* (2023.01)
*G01S 7/481* (2006.01)
*G01S 17/894* (2020.01)
*H04N 13/289* (2018.01)
*H04N 25/53* (2023.01)
*H04N 25/705* (2023.01)
*H04N 25/77* (2023.01)
*H10F 39/00* (2025.01)
*H10F 39/18* (2025.01)

(52) U.S. Cl.
CPC ....... *H04N 25/7795* (2023.01); *G01S 7/4816* (2013.01); *G01S 17/894* (2020.01); *H04N 25/53* (2023.01); *H04N 25/705* (2023.01); *H04N 25/77* (2023.01); *H10F 39/811* (2025.01); *H04N 13/289* (2018.05); *H10F 39/18* (2025.01)

(58) Field of Classification Search
CPC .. H04N 25/7795; H04N 25/53; H04N 25/705; H04N 25/77; H04N 13/289; H04N 23/60; H04N 25/703; H04N 13/271; H04N 5/33; G01S 7/4816; G01S 17/894; G01S 7/4865; H10F 39/811; H10F 39/18
See application file for complete search history.

(56) References Cited

U.S. PATENT DOCUMENTS

| | | | |
|---|---|---|---|
| 7,450,220 B2 | 11/2008 | O'Connor et al. | |
| 9,568,607 B2 | 2/2017 | Bae et al. | |
| 11,378,690 B2 | 7/2022 | Keel et al. | |
| 2014/0375851 A1* | 12/2014 | Lee | H04N 25/7795 348/294 |
| 2022/0075070 A1 | 3/2022 | Kawahito | |
| 2022/0107421 A1 | 4/2022 | Kim et al. | |

(Continued)

*Primary Examiner* — Albert H Cutler
(74) *Attorney, Agent, or Firm* — Sughrue Mion, PLLC

(57) ABSTRACT

An image sensor is disclosed. The image sensor includes: a demodulation clock generation circuit configured to generate M demodulation clock signals having N phases; a buffer circuit including M signal lines configured to transfer each of the M demodulation clock signals; and a pixel array including a plurality of pixels, wherein a pixel of the plurality of pixels has M taps and is configured to receive M demodulation signals passing through the M signal lines as inputs. Each of the M demodulation signals is conducted by each of the M signal lines during an integration time of one frame of the pixel, and M and N are integers greater than or equal to 2.

20 Claims, 24 Drawing Sheets

(56) References Cited

U.S. PATENT DOCUMENTS

| | | |
|---|---|---|
| 2022/0113410 A1 | 4/2022 | Sugiyama |
| 2022/0124276 A1* | 4/2022 | Song .................... G01S 17/894 |
| 2022/0252727 A1 | 8/2022 | Yasu et al. |
| 2022/0337766 A1 | 10/2022 | Jin |
| 2023/0077551 A1* | 3/2023 | Kim .................... H04N 25/705 |

* cited by examiner

FIG. 4C

IMAGE SENSOR AND CAMERA MODULE INCLUDING THE SAME

CROSS-REFERENCE TO RELATED APPLICATIONS

This application claims priority to Korean Patent Application Nos. 10-2023-0039131, filed on Mar. 24, 2023, and 10-2023-0049579, filed on Apr. 14, 2023, in the Korean Intellectual Property Office, the disclosures of which are incorporated by reference herein in their entireties.

BACKGROUND

The present disclosure relates to an image sensor and a camera module including the same, and more particularly, to reducing an error of a demodulation signal applied to an image sensor based on an optical time-of-flight (ToF).

A ToF-based image sensor may generate a three-dimensional (3D) image of an object by measuring information about a distance to the object. The ToF-based image sensor may obtain information about a distance to an object by measuring a light flight time which corresponds a time for light reflected from the object to be received after light is irradiated to the object. Because the information about a distance includes noise due to various factors, there is a need to minimize noise in order to obtain accurate information.

SUMMARY

One or more example embodiments provide an image sensor capable of improving mismatching between demodulation signals.

According to an aspect of an example embodiment, there is provided an image sensor.

The image sensor includes: a demodulation clock generation circuit configured to generate M demodulation clock signals having N phases; a buffer circuit including M signal lines configured to transfer each of the M demodulation clock signals; and a pixel array including a plurality of pixels, wherein a pixel of the plurality of pixels has M taps and is configured to receive M demodulation signals passing through the M signal lines as inputs. Each of the M demodulation signals is conducted by each of the M signal lines during an integration time of one frame of the pixel, and M and N are integers greater than or equal to 2.

According to another aspect of an example embodiment, there is provided an image sensor.

The image sensor includes: a demodulation clock generation circuit configured to generate a first demodulation clock signal having a first phase, a second demodulation clock signal having a second phase, a third demodulation clock signal having a third phase, and a fourth demodulation clock signal having a fourth phase; a buffer circuit including a first signal line, a second signal line, a third signal line, and a fourth signal line configured to transfer the first demodulation clock signal, the second demodulation clock signal, the third demodulation clock signal, and the fourth demodulation clock signal; and a pixel array including a plurality of pixels configured to receive a first tap signal, a second tap signal, a third tap signal, and a fourth tap signal passing through the first to fourth signal lines as inputs of a pixel, among the plurality of pixels, having four taps. An integration time of one frame includes a first section, a second section, a third section and a fourth section, and the first tap signal passes through the first signal line in the first section, the second signal line in the second section, the third signal line in the third section, and the fourth signal line in the fourth section.

According to another aspect of an example embodiment, there is provided a camera module.

The camera module includes: a light source configured to transmit a light signal to an object; and an image sensor configured to receive the light signal reflected from the object. The image sensor includes: a demodulation clock generation circuit configured to generate M demodulation clock signals having N phases; a buffer circuit including M signal lines configured to transfer each of the M demodulation clock signals; and a pixel array including a plurality of pixels, wherein a pixel of the plurality of pixels has M taps and is configured to receive M demodulation signals passing through the M signal lines as inputs. Each of the M demodulation signals is conducted by each of the M signal lines during an integration time of one frame of the pixel, and M and N are integers greater than or equal to 2.

BRIEF DESCRIPTION OF DRAWINGS

The above and other aspects will be more apparent from the following description of example embodiments taken in conjunction with the accompanying drawings, in which:

FIG. 4C is a diagram for explaining a method of matching signal lines, according to an example embodiment;

DETAILED DESCRIPTION

Hereinafter, example embodiments are described with reference to the accompanying drawings. Example embodiments described herein are example embodiments, and thus, the present disclosure is not limited thereto, and may be realized in various other forms. Each example embodiment provided in the following description is not excluded from being associated with one or more features of another example or another embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
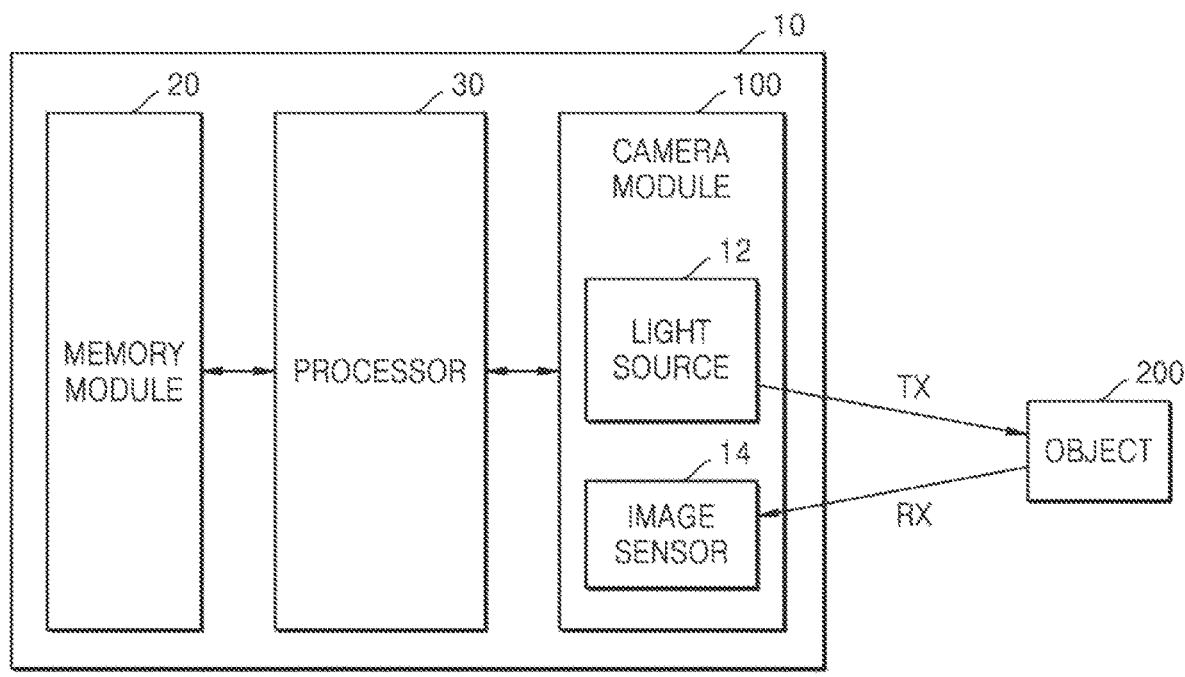
FIG. 1 is a schematic structural diagram of a system according to an example embodiment.

FIG. 1 is a schematic structural diagram of a system according to an example embodiment.

Referring to FIG. 1, a system 10 may include a processor 30 and a camera module (i.e., camera) 100. The system 10 may further include a memory module (i.e., memory) 20 that is connected to the processor 30 and stores information such as image data received from the camera module 100. In an example embodiment, the system 10 may be integrated on one semiconductor chip, and each of the camera module 100, the processor 30, and the memory module 20 may be implemented as a separate semiconductor chip. The memory module 20 may include one or more memory chips. In an example embodiment, the processor 30 may include multiple processing chips.

The system 10 may be an electronic device for application of an image sensor for distance measurement according to an example embodiment. The system 10 may be portable or stationary. Examples of a portable form of the system 10 may include a mobile device, cell phone, smartphone, user equipment (UE), tablet, digital camera, laptop or desktop computer, electronic smart watch, machine-to-machine (M2M) communication device, virtual reality (VR) device or module, robot, and the like. Examples of stationary types of the system 10 may include game consoles in video game rooms, interactive video terminals, automobiles, machine vision systems, industrial robots, VR devices, driver-side mounted cameras in automobiles, and the like.

The system 10 is not affected by the stack structure used by the sensor and may be applied to all stack structure sensors. According to an example, the system 10 may be applied to a sensor having any one of a structure of a single chip, a two-stack sensor, and a three-stack sensor.

The camera module 100 may include a light source 12 and an image sensor 14. The light source 12 may transmit a transmission optical signal TX to an object 200. The transmission light signal TX output from the light source 12 may be reflected on the object 200, and the image sensor 14 may receive a reception light signal RX reflected from the object 200. The image sensor 14 may obtain depth information, which is distance information about the object 200, using time-of-flight (ToF).

The light source 12 may include a light emitting element and a light source driver driving the light emitting element. The image sensor 14 may include a pixel array, a control circuit for driving the pixel array, and a readout circuit for reading out a pixel signal output from the pixel array. The image sensor 14 may obtain depth information at high accuracy by applying a demodulation signal with mismatching reduced to a pixel array.

The processor 30 may be a central processing unit (CPU). In an example embodiment, in addition to the CPU, the processor 30 may further include a microcontroller, a digital signal processor (DSP), a graphics processing unit (GPU), a dedicated application specific integrated circuit (ASIC) processor, and the like. In addition, the processor 30 may include more than one CPU operating in a distributed processing environment. In an example embodiment, the processor 30 may be a system on chip (SoC) having functions additional to those of the CPU.

The processor 30 may control operations of the light source 12 and the image sensor 14. In an example embodiment, the system 10 may include a mode switch that is controlled by a user to switch between a 2D imaging mode and a 3D imaging mode. When the user selects the 2D imaging mode using the mode switch, the processor 30 may activate the image sensor 14, and because the 2D imaging mode uses ambient light, the light source 12 may not be activated.

When a user selects a 3D imaging mode using the mode switch, the processor 30 may activate both the light source 12 and the image sensor 14. Processed image data received from a read-out circuit 130 may be stored in the memory module 20 by the processor 30. The processor 30 may display a 2D or 3D image selected by the user on the display screen of the system 10. The processor 30 may be programmed with software or firmware to perform various processing tasks, including those described herein. In an example embodiment, the processor 30 may include programmable hardware logic circuits to perform some or all of the functions described above. For example, the memory module 20 may store program code, look-up tables, or intermediate calculation results so that the processor 30 performs a corresponding function.

The memory module 20 may be, for example, dynamic random access memory (DRAM) such as synchronous DRAM (SDRAM), a high bandwidth memory (HBM) module, or a DRAM-based 3-dimensional stack (3DS) memory module such as a hybrid memory cube (HMC) memory module. The memory module 20 may be, for example, a semiconductor-based storage, such as a solid state drive (SSD), a DRAM module, static random access memory (SRAM), phase-change random access memory (PRAM), resistive random access memory (RRAM), conductive-bridging RAM (CBRAM), magnetic RAM (MRAM), spin-transfer torque MRAM (STT-MRAM), or the like.

Figure 2:
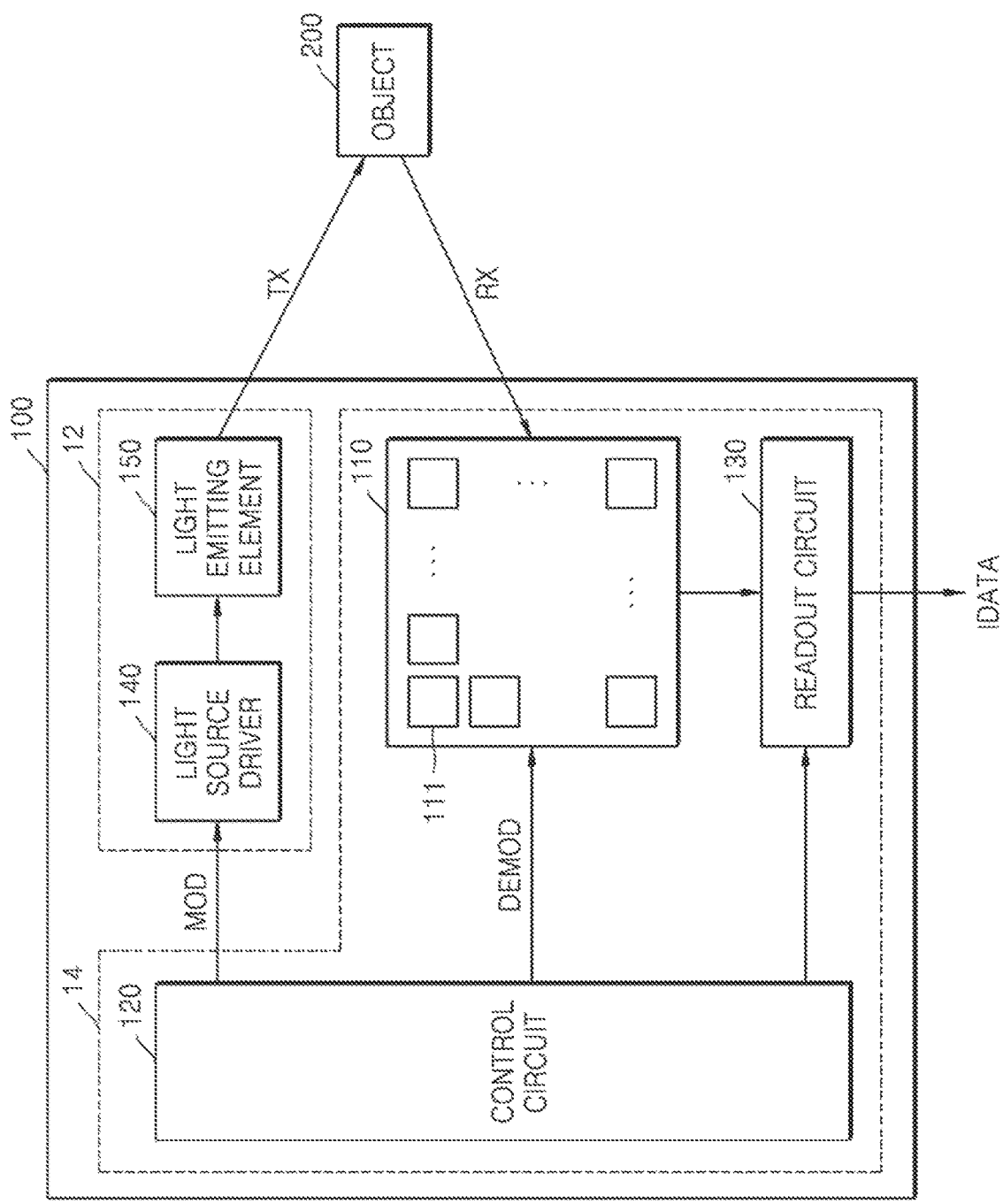
FIG. 2 is a configuration diagram for explaining a camera module according to an example embodiment.

FIG. 2 is a configuration diagram for explaining a camera module according to an example embodiment.

Referring to FIGS. 1 and 2, a camera module 100 may be used to obtain distance information about the object 200. The distance information may be calculated by the processor 30 based on image data IDATA output from an image sensor 14 or may be independently calculated inside the image sensor 14. In an example embodiment, the distance information may be used by the processor 30 as part of the three-dimensional user interface to enable a user of the system 10 to interact with or use three-dimensional image of object 200 as part of a game or other application running on the system 10.

A light source 12 may include a light source driver 140 and a light emitting element 150. The light source 12 may further include a lens.

The light emitting element 150 may transmit a transmission optical signal TX to the object 200. The light emitting element 150 may be a laser diode (LD) or light emitting diode (LED) emitting infrared or visible light, a near-infrared laser, a point light source, a monochromatic light source in which a white lamp and a monochromator are combined, or a combination of other laser light sources. For example, the light emitting element 150 may be a verticalcavity surface-emitting laser (VCSEL). In an example embodiment, the light emitting element 150 may output an infrared transmission light signal TX having a wavelength of about 800 nm to about 1000 nm.

The light source driver 140 may generate a driving signal for driving the light emitting element 150. The light source driver 140 may drive the light emitting element 150 in response to the modulation signal MOD received from a control circuit 120.

The image sensor 14 may measure distance or depth using the ToF principle. The reception optical signal RX reflected from the object 200 may be received by the image sensor 14. The image sensor 14 may include a pixel array 110, the control circuit 120, and a readout circuit 130. The image sensor 14 may further include a lens, and the reception optical signal RX may be provided to the pixel array 110 through the lens.

The pixel array 110 may include a plurality of unit pixels 111. The plurality of unit pixels 111 may operate in a ToF method. The ToF method may be a method of calculating depth using the phase difference between a reflected wave of a modulation light source and a demodulation signal. According to an example, the pixel array 110 using the ToF method may store electrons generated by signals received using demodulation signals having four phases in taps of each phase. The structure of each of the plurality of unit pixels 111 is described below with reference to FIG. 3 and the like.

The pixel array 110 may be an RGB pixel array in which different pixels collect different colored lights. The pixel array 110 may be, for example, a two-dimensional sensor, such as a two-dimensional RGB sensor with an infrared (IR) cut-off filter, a two-dimensional infrared (IR) sensor, a two-dimensional near-infrared (NIR) sensor, a two-dimensional RGBW sensor, a two-dimensional RGB-IR sensor, and the like. The system 10 may use the same pixel array 110 not only for measuring the distance to the object 200 but also for imaging the two-dimensional RGB color of the object 200 (or a scene including an object).

The pixel array 110 may convert the received reception optical signal RX into corresponding electrical signals, that is, pixel signals. The readout circuit 130 may generate image data IDATA based on pixel signals output from the pixel array 110. For example, the readout circuit 130 may perform analog-to-digital conversion on pixel signals.

The image sensor 14 may further include a memory and an image signal processor. The image data IDATA may be stored in the memory, and the image signal processor may calculate distance information or depth information by processing the image data IDATA. The memory or the image signal processor may be provided outside the image sensor 14.

The control circuit 120 may control components of the image sensor 14 (e.g., the pixel array 110 and the readout circuit 130) and may control the light source driver 140 of the light source 12. The control circuit 120 may transmit the modulation signal MOD to the light source driver 140 and transmit demodulation signals DEMOD corresponding to the modulation signal MOD to the pixel array 110. The demodulation signals DEMOD may refer to signals for controlling each of transfer transistors included in each of the unit pixels 111 but are not limited thereto.

When the control circuit 120 outputs the demodulation signals DEMOD having different phases, the control circuit 120 may control switches included in the control circuit 120 to share all of the plurality of signal lines corresponding to the respective demodulation signals DEMOD. Accordingly, the image sensor 14 may minimize the duty cycle and the phase difference between demodulation signals having different phases.

Figure 3:
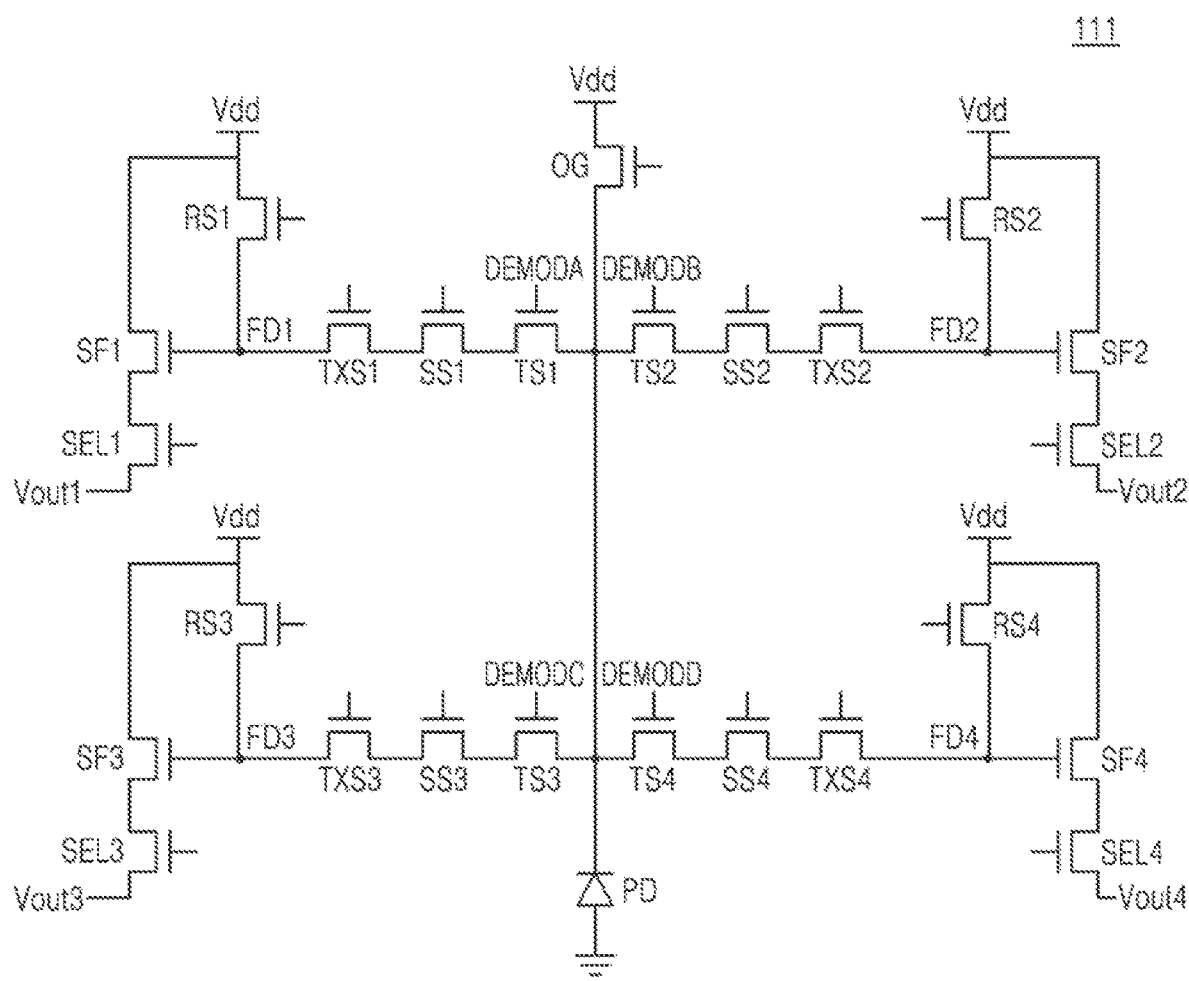
FIG. 3 is a diagram for explaining an example embodiment of a structure of a unit pixel shown in FIG. 2.

FIG. 3 is a diagram for explaining an example embodiment of a structure of a unit pixel shown in FIG. 2.

As shown in FIG. 3, the unit pixel 111 may have a 4-tap structure. The 4-tap structure refers to a structure in which one unit pixel 111 includes four taps, and as an external optical signal is irradiated, a tap may refer to a unit component capable of transferring photoelectric charges generated and accumulated in the unit pixel 111 by distinguishing between the photoelectric charges by phase.

An image sensor (e.g., 14 in FIG. 2) including unit pixels 111 having a 4-tap structure may implement a method of transmitting pixel signals with respect to phases of 0°, 90°, 180°, and 270° using four taps. For example, based on a first tap of the unit pixel 111, when the first tap of the unit pixel 111 generates the first pixel signal Vout1 with a phase of 0°, a second tap may generate a second pixel signal Vout2 with a phase of 90°, a third tap may generate a third pixel signal Vout3 with a phase of 180°, and a fourth tap may generate a fourth pixel signal Vout4 with a phase of 270°.

Referring to FIG. 3, the unit pixel 111 may include a photodiode PD, an overflow gate OG, transfer transistors TS1 to TS4, storage transistors SS1 to SS4, tap transfer transistors TXS1 to TXS4, reset transistors RS1 to RS4, source followers SF1 to SF4, and select transistors SEL1 to SEL4. According to an example embodiment, at least one of the overflow gate OG, the storage transistors SS1 to SS4, the tap transfer transistors TXS1 to TXS4, the reset transistors RS1 to RS4, the source followers SF1 to SF4, and the select transistors SEL1 to SEL4 may be omitted.

The photodiode PD may generate photoelectric charges that vary depending on the intensity of the reception light signal (e.g., RX of FIG. 2). That is, the photodiode PD may convert the reception optical signal RX into an electrical signal. The photodiode PD is an example of a photoelectric conversion element, and may be at least one of a photo transistor, a photogate, a pinned photodiode (PPD), and a combination thereof.

Each of the first to fourth transfer transistors TS1 to TS4 may transfer charges generated by the photodiode PD to each of the first to fourth storage transistors SS1 to SS4 based on first to fourth demodulation signals DEMODA to DEMODD. Accordingly, each of the first to fourth transfer transistors TS1 to TS4 may transfer charges generated by the photodiode PD to first to fourth floating diffusion nodes FD1 to FD4 based on the first to fourth demodulation signals DEMODA to DEMODD.

The first to fourth demodulation signals DEMODA to DEMODD may be included in the demodulation signals DEMOD of FIG. 2 and may be signals having the same frequency and duty ratio and different phases. The first to fourth demodulation signals DEMODA to DEMODD may have a phase difference of 90° From each other. For example, based on the first demodulation signal DEMODA, when the first demodulation signal DEMODA has a phase of 0°, the second demodulation signal DEMODB may have a phase of 90°, the third demodulation signal DEMODC may have a phase of 180°, and the fourth demodulation signal DEMODD may have a phase of 270°.

The first to fourth storage transistors SS1 to SS4 may store photoelectric charges transmitted through the first to fourth transfer transistors TS1 to TS4, respectively, and the first to fourth tap transfer transistors TXS1 to TXS4 may transfer photoelectric charges stored in the first to fourth storage transistors SS1 to SS4, respectively, to the first to fourth floating diffusion nodes FD1 to FD4.

Depending on the potential due to the photoelectric charges accumulated in the first to fourth floating diffusion nodes FD1 to FD4, the first to fourth source followers SF1 to SF4 may amplify the corresponding photoelectric charges and output the amplified photoelectric charges to the first to fourth selection transistors SEL1 to SEL4. The first to fourth selection transistors SEL1 to SEL4 may output first to fourth pixel signals Vout1 to Vout4 through column lines in response to the selection control signals.

The unit pixel 111 may accumulate photoelectric charges for a certain period of time, for example, an integration time, and may output the first to fourth pixel signals Vout1 to Vout4 generated depending on the accumulation result to a readout circuit (e.g., 130 in FIG. 2).

The first to fourth reset transistors RS1 to RS4 may reset the first to fourth floating diffusion nodes FD1 to FD4 with a power supply voltage VDD. The overflow gate OG is a transistor for discharging overflow charge, and a source of the overflow gate OG may be connected to the photodiode PD, and a drain of the overflow gate OG may be provided with the power supply voltage VDD.

A pixel having a 4-tap structure has been illustrated and described with reference to FIG. 3, but example embodiments are not limited thereto. For example, as described below with reference to FIG. 7, the image sensor 14 may include pixels having a 2-tap structure.

Figure 4A:
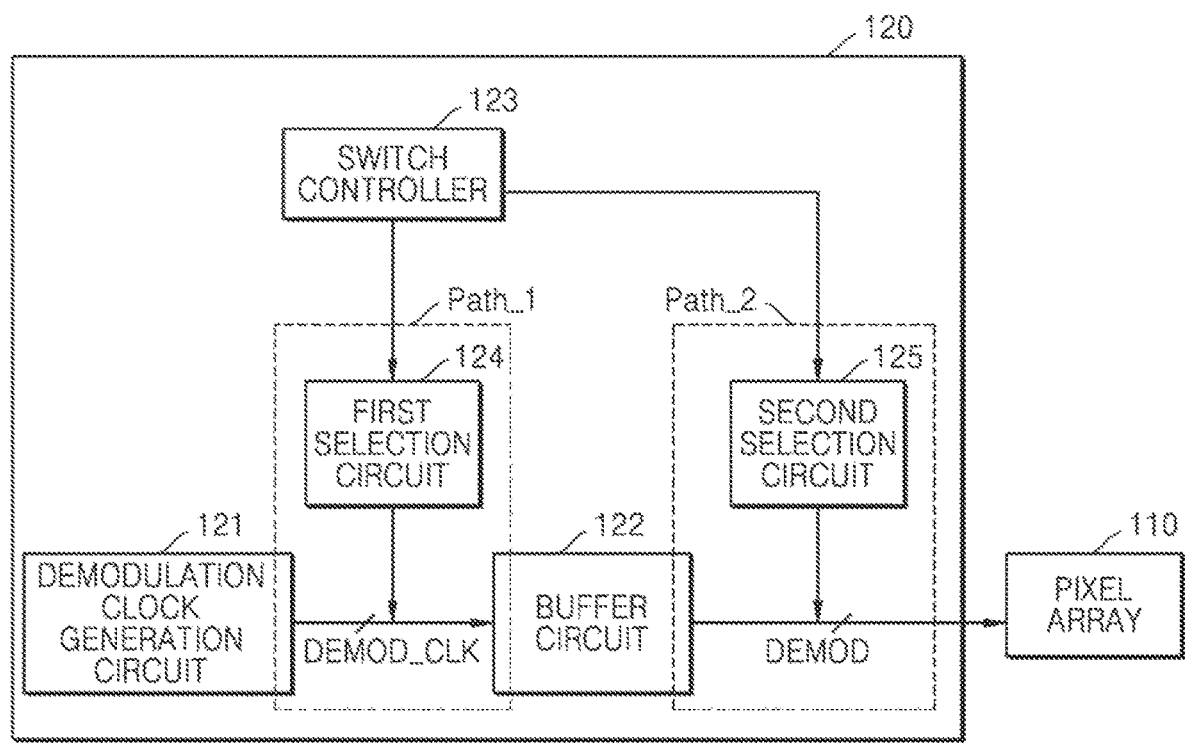
FIG. 4A is a block diagram for explaining a control circuit according to an example embodiment.

FIG. 4A is a block diagram for explaining a control circuit according to an example embodiment.

A control circuit 120 shown in FIG. 4A may correspond to the control circuit 120 in FIG. 2. The control circuit 120 may include a demodulation clock generation circuit 121, a buffer circuit 122, a switch controller 123, a first selection circuit 124, and a second selection circuit 125.

The demodulation clock generation circuit 121 may generate a plurality of demodulation clock signals DEMOD_CLK. The demodulation clock generation circuit 121 may generate M demodulation clock signals DEMOD_CLK. According to an example, M may be the number of taps included in a unit pixel included in the pixel array 110. For example, when the demodulation clock signals DEMOD_CLK are applied to a pixel array including unit pixels having a 4-tap structure, M may be four and the demodulation clock generation circuit 121 may generate four demodulation clock signals DEMOD_CLK. The four demodulation clock signals DEMOD_CLK may have the same frequency and duty ratio and different phases. For example, the demodulation clock generation circuit 121 may generate a first demodulation clock signal to a fourth demodulation clock signal, wherein the first demodulation clock signal may have a phase of 0°, the second demodulation clock signal may have a phase of 90°, the third demodulation clock signal may have a phase of 180°, and the fourth demodulation clock signal may have a phase of 270°. According to an example, the demodulation clock generation circuit 121 may generate demodulation clock signals DEMOD_CLK corresponding to four phases in order to supply a demodulation signal to a ToF image sensor composed of a plurality of demodulation pixel arrays.

M demodulation clock signals DEMOD_CLK output from the demodulation clock generation circuit 121 may be applied to the buffer circuit 122. The buffer circuit 122 may be a driving buffer. The buffer circuit 122 may be a buffer circuit for driving the applied demodulation clock signals DEMOD_CLK. The buffer circuit 122 may include M signal lines for applying the M demodulation clock signals DEMOD_CLK to unit pixels of the pixel array 110. The buffer circuit 122 may include a number of signal lines corresponding to the input demodulation clock signals DEMOD_CLK.

The demodulation signals DEMOD output from the buffer circuit 122 may be applied to the pixel array 110.

Referring to FIG. 4A, the signal output from the demodulation clock generation circuit 121 may pass through a first path Path_1 and a second path Path_2 before being applied to the pixel array 110. According to example embodiments, M demodulation signals DEMOD passing through the first path Path_1 and the second path Path_2 may share all M signal lines included in the buffer circuit 122. According to an example, the first selection circuit 124 may be connected to the first path Path_1 and the second selection circuit 125 may be connected to the second path Path_2. Each of the first selection circuit 124 and the second selection circuit 125 may include a plurality of switches. According to an example, the switch controller 123 may control turn-on timing of switches included in the first selection circuit 124 and the second selection circuit 125. The switch controller 123 may control the first selection circuit 124 and the second selection circuit 125 so that demodulation signals of all phases may experience the same signal line during an integration time corresponding to one frame of a unit pixel. The switch controller 123 may control switches in the first selection circuit 124 and the second selection circuit 125 so that the demodulation clock signal and the demodulation signal having a phase corresponding to the phase of the demodulation clock signal are connected to different signal lines for each section in each of at least M identical time sections.

According to an example, the switch controller 123 may be a controller for mixing demodulation signals passing through the first path Path_1 and the second path Path_2. The switch controller 123 according to example embodiments may remove a mismatch between the demodulation signals by mixing signal lines corresponding to two or more demodulation clock signals. Through this, the accuracy of depth information may be improved.

Figure 4B:
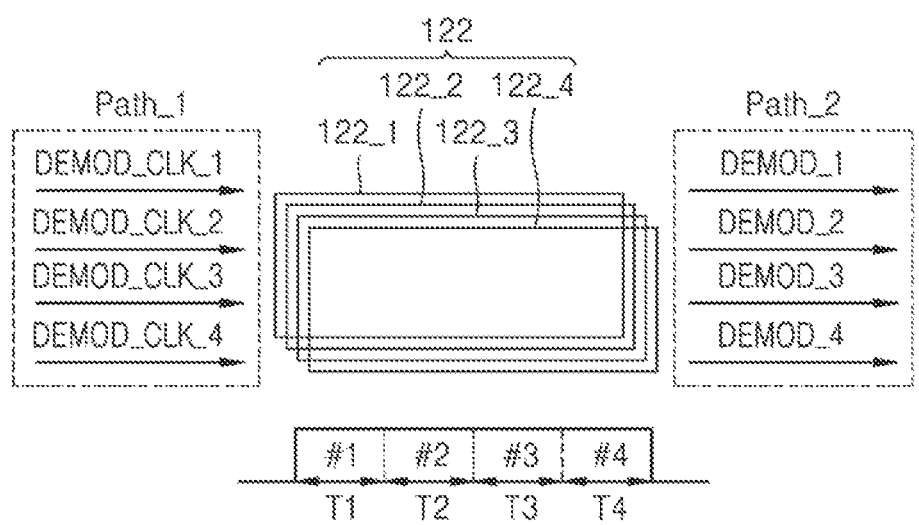
FIG. 4B is a diagram for explaining an operating method of a control circuit, according to an example embodiment.

FIG. 4B is a diagram for explaining an operating method of a control circuit, according to an example embodiment. In more detail, FIG. 4B shows a plurality of signal lines 122_1, 122_2, 122_3, 122_4 included in the control circuit 120, a plurality of demodulation clock signals DEMOD_CLK_1, DEMOD_CLK_2, DEMOD_CLK_3, and DEMOD_CLK_4, a plurality of demodulation signals DEMOD_1, DEMOD_2, DEMOD_3, and DEMOD_4, and an integration time corresponding to one frame.

Referring to FIG. 4B, the first signal line 122_1, the second signal line 122_2, the third signal line 122_3, and the fourth signal line 122_4 each included in the buffer circuit 122 are shown. The first path Path_1 includes four demodulation clock signals DEMOD_CLK_1, DEMOD_CLK_2, DEMOD_CLK_3, and DEMOD_CLK_4 and the second path Path_2 includes four demodulation signals DEMOD_1, DEMOD_2, DEMOD_3, and DEMOD_4. The example of FIG. 4B may be an example embodiment applied to a unit pixel having a 4-tap structure.

The demodulation clock signals DEMOD_CLK_1, DEMOD_CLK_2, DEMOD_CLK_3, and DEMOD_CLK_4 and the demodulation signals DEMOD_1, DEMOD_2, DEMOD_3, and DEMOD_4 may each have a phase. The demodulation clock signals DEMOD_CLK_1, DEMOD_CLK_2, DEMOD_CLK_3, and DEMOD_CLK_4 and the demodulation signals DEMOD_1, DEMOD_2, DEMOD_3, and DEMOD_4 may be connected to signals having corresponding phases.

For example, the first demodulation clock signal DEMOD_CLK_1 has a phase of 0°, the second demodulation clock signal DEMOD_CLK_2 has a phase of 90°, the third demodulation clock signal DEMOD_CLK_3 has a phase of 180°, and the fourth demodulation clock signal DEMOD_CLK_4 has a phase of 270°. The first demodulation signal DEMOD_1 has a phase of 0°, the second demodulation signal DEMOD_2 has a phase of 90°, the third demodulation signal DEMOD_3 has a phase of 180°, and the fourth demodulation signal DEMOD_4 has a phase of 270°. In this case, because the first demodulation clock signal DEMOD_CLK_1 has the same phase as the first demodulation signal DEMOD_1, the first demodulation clock signal DEMOD_CLK_1 must be connected to the first demodulation signal DEMOD_1. Because the first demodulation clock signal DEMOD_CLK_1 has a different phase from that of the second demodulation signal DEMOD_2, the first demodulation clock signal DEMOD_CLK_1 is not connected to the second demodulation signal DEMOD_2.

The graph shown in FIG. 4B shows the integration time corresponding to one frame of unit pixels. The integration time may include a first section #1, a second section #2, a third section #3, and a fourth section #4. The length of the first section #1 may be T1, the length of the second section #2 may be T2, the length of the third section #3 may be T3, and the length of the fourth section #4 may be T4. For example, the integration time may be may be divided into four equal sections, and each of the first section #1, the second section #2, the third section #3, and the fourth section #4 may have the same length.

According to example embodiments, in each of the first section #1, the second section #2, the third section #3, and the fourth section #4, the demodulation clock signals DEMOD_CLK_1, DEMOD_CLK_2, DEMOD_CLK_3, and DEMOD_CLK_4 included in the first path Path_1 and the demodulation signals DEMOD_1, DEMOD_2, DEMOD_3, and DEMOD_4 included in the second path Path_2 may be connected to the first to fourth signal lines 122_1, 122_2, 122_3, and 122_4 included in the buffer circuit 122, respectively.

According to an example, in the first section #1, the first demodulation clock signal DEMOD_CLK_1 may be connected to the first demodulation signal DEMOD_1 through the first signal line 122_1. In the second section #2, the first demodulation clock signal DEMOD_CLK_1 may be connected to the first demodulation signal DEMOD_1 through the second signal line 122_2. In the third section #3, the first demodulation clock signal DEMOD_CLK_1 may be connected to the first demodulation signal DEMOD_1 through the third signal line 122_3. In the fourth section #4, the first demodulation clock signal DEMOD_CLK_1 may be connected to the first demodulation signal DEMOD_1 through the fourth signal line 122_4. As described above, in the process of matching the first demodulation clock signal DEMOD_CLK_1 having a phase of 0° to the first demodulation signal DEMOD_1 having a phase of 0°, by matching different signal lines for each section, the duty cycle and the phase difference may be minimized. Only the first demodulation clock signal DEMOD_CLK_1 has been described, but this may be equally applied to the second demodulation clock signal DEMOD_CLK_2, the third demodulation clock signal DEMOD_CLK_3, and the fourth demodulation clock signal DEMOD_CLK_4.

In the example of FIG. 4B, an example of matching four demodulation signals input to a unit pixel having four taps by dividing the four demodulation signals into four equal sections has been described, but example embodiments not limited thereto, and example embodiments may also be applied to the case where M demodulation signals input to a unit pixel having M taps are divided into at least M equal sections and matched to different signal lines in each section.

According to an example, the M demodulation signals may include N phases. According to an example, M may be equal to N. Alternatively, M may be a different value than N. M and N may be integers greater than or equal to 2. M may be a number corresponding to the number of taps of a unit pixel. M may be the number of signal lines included in a buffer circuit. M may be a minimum reference value for dividing the integration time. An image sensor according to example embodiments may be a ToF sensor using two or more taps and two or more demodulation signals.

Figure 4C:
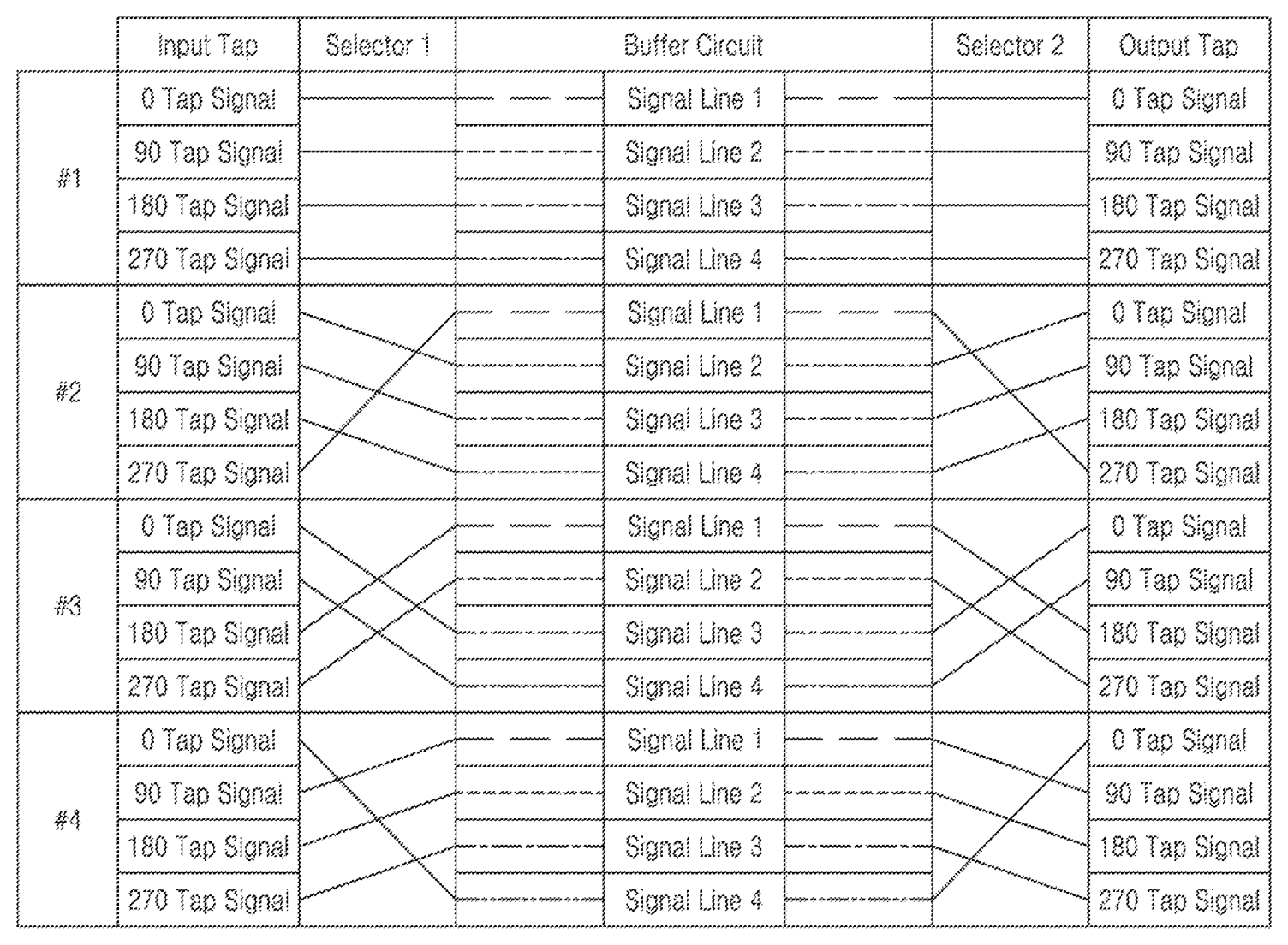

FIG. 4C is a diagram for explaining a method of matching signal lines, according to an example embodiment.

1, #2, #3, and #4 shown in FIG. 4C may respectively correspond to each of the first section, the second section, the third section, and the fourth section, which are each a section of the integration time shown in FIG. 4B.

The input taps of FIG. 4C may refer to output terminals respectively corresponding to 0°, 90°, 180°, and 270° demodulation clock signals generated by the demodulation clock generation circuit 121 of FIG. 4A. A first selection circuit selector 1 shown in FIG. 4C may be a selection circuit connected to the first path Path_1. The buffer circuit shown in FIG. 4C may have a configuration corresponding to the buffer circuit 122 of FIG. 4A. According to an example, the buffer circuit may include a plurality of signal lines corresponding to the number of taps. Referring to FIG. 4C, because a 4-tap example embodiment is shown, the number of signal lines included in the buffer circuit may be four. A second selection circuit selector 2 shown in FIG. 4C may be a selection circuit connected to the second path Path_2. An output tap shown in FIG. 4C may refer to an input terminal of each tap included in a unit pixel of a pixel array.

In FIG. 4C, a 0 Tap signal, which is a tap signal having a phase of 0°, may be a signal corresponding to the first demodulation clock signal and the first demodulation signal. A 90 Tap signal, which is a tap signal having a phase of 90°, may be a signal corresponding to the second demodulation clock signal and the second demodulation signal. A 180 Tap signal, which is a tap signal having a phase of 180°, may be a signal corresponding to the third demodulation clock signal and the third demodulation signal. A 270 Tap signal, which is a tap signal having a phase of 270°, may be a signal corresponding to the fourth demodulation clock signal and the fourth demodulation signal. The first demodulation signal may be described as being mixed with a first tap signal, the second demodulation signal may be mixed with a second tap signal, the third demodulation signal may be mixed with a third tap signal, and the fourth demodulation signal may be mixed with a fourth tap signal. According to an example, the first tap signal, the second tap signal, the third tap signal, and the fourth tap signal may indicate signals having different phases respectively input to unit pixels having a 4-tap structure.

Referring to FIG. 4C, in the first section #1, the first demodulation clock signal is connected to the first signal line Signal Line 1 and may be output to a first tap corresponding to a phase of 0°. The second demodulation clock signal may be connected to the second signal line Signal Line 2 and output to a second tap corresponding to a phase of 90°. The third demodulation clock signal may be connected to the third signal line Signal Line 3 and output to a third tap corresponding to a phase of 180°. The fourth demodulation clock signal may be connected to the fourth signal line Signal Line 4 and output to a fourth tap corresponding to a phase of 270°.

In the second section #2, the first demodulation clock signal may be connected to the second signal line Signal Line 2 and output to a first tap. The second demodulation clock signal may be connected to the third signal line Signal Line 3 and output to the second tap. The third demodulation clock signal may be connected to the fourth signal line Signal Line 4 and output to a third tap. The fourth demodulation clock signal may be connected to the first signal line Signal Line 1 and output to the fourth tap.

In the third section #3, the first demodulation clock signal may be connected to the third signal line Signal Line 3 and output to a first tap. The second demodulation clock signal may be connected to the fourth signal line Signal Line 4 and output to the second tap. The third demodulation clock signal may be connected to the first signal line Signal Line 1 and output to the third tap. The fourth demodulation clock signal may be connected to the second signal line Signal Line 2 and output to the fourth tap.

In the fourth section #4, the first demodulation clock signal may be connected to the fourth signal line Signal Line 4 and output to a first tap. The second demodulation clock signal may be connected to the first signal line Signal Line 1 and output to the second tap. The third demodulation clock signal may be connected to the second signal line Signal Line 2 and output to the third tap. The fourth demodulation clock signal may be connected to the third signal line Signal Line 3 and output to the fourth tap.

The first selection circuit Selector 1 is connected between an input tap and the signal lines, and may match each signal line to a demodulation clock signal having a different phase for each section.

The second selection circuit Selector 2 is connected between the signal lines and an output tap, and may match the tap corresponding to the phase of the demodulation clock signal passing through the signal lines for each section.

Figure 4D:
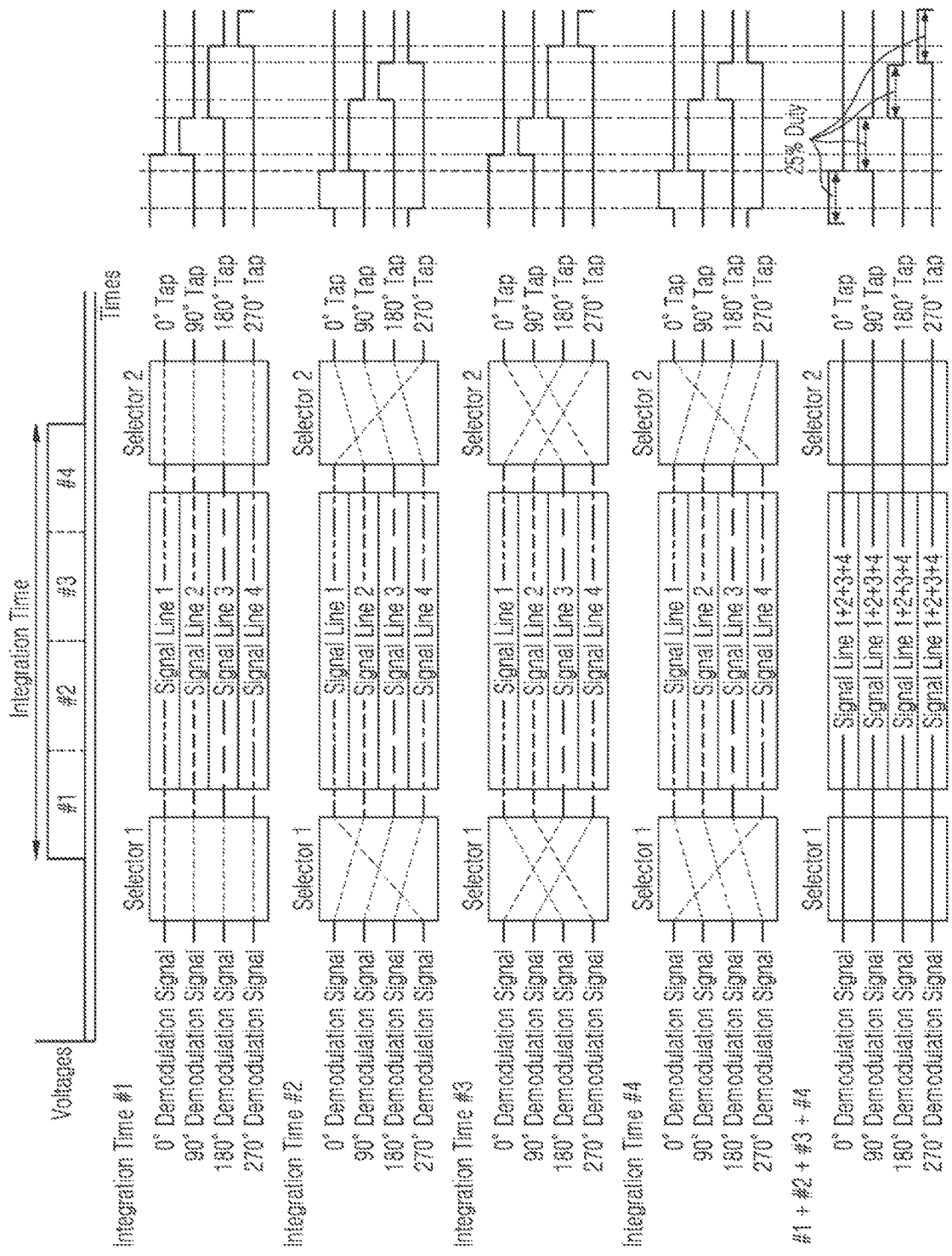
FIG. 4D is a diagram for explaining an effect according to a signal line matching method according to an example embodiment.

FIG. 4D is a diagram for explaining an effect according to a signal line matching method according to an example embodiment. In the description of FIG. 4D, the description given in FIG. 4C is omitted.

Referring to FIG. 4D, timing diagrams of clock signals based on matching results of signal lines in each of the first section #1, the second section #2, the third section #3, and the fourth section #4 are shown together.

According to example embodiments, two selection circuits Selector 1 and Selector 2 composed of switch arrays may be placed at the output of the demodulation clock generation circuit and the input of the pixel array. According to example embodiments, the two selection circuits Selector 1 and Selector 2 equally divide and switch the integration time, which is the time at which demodulation is performed. The first selection circuit Selector 1 may select a signal line to be transmitted and the second selection circuit Selector 2 may select the transmitted demodulation signal to connect the selected demodulation signal to a desired tap.

Referring to FIG. 4D, in each of the first section #1, the second section #2, the third section #3, and the fourth section #4, the first signal line Signal Line 1, the second signal line Signal Line 2, the third signal line Signal Line 3, and the fourth signal line Signal Line 4 may respectively pass demodulation signals of all phases. As a result, in the integration time formed by adding all of the first section, the second section, the third section, and the fourth section, because the demodulation signals having different phases pass through each signal line equally, mismatching occurring in the demodulation signal line may be equally divided and averaged and the duty cycle may have an average value of 25%.

Demodulation signals may be mixed in order to solve a problem in which error components such as duty cycles and phase delays between demodulation signals are different. Demodulation signals having respective phases that pass through at regular intervals are exchanged with each other so that paths of all signal lines are experienced during the same period of time, thereby minimizing mismatching caused by the difference. Problems caused by duty errors and phase errors between demodulation signals may be alleviated by minimizing the mismatching.

Figure 5A:
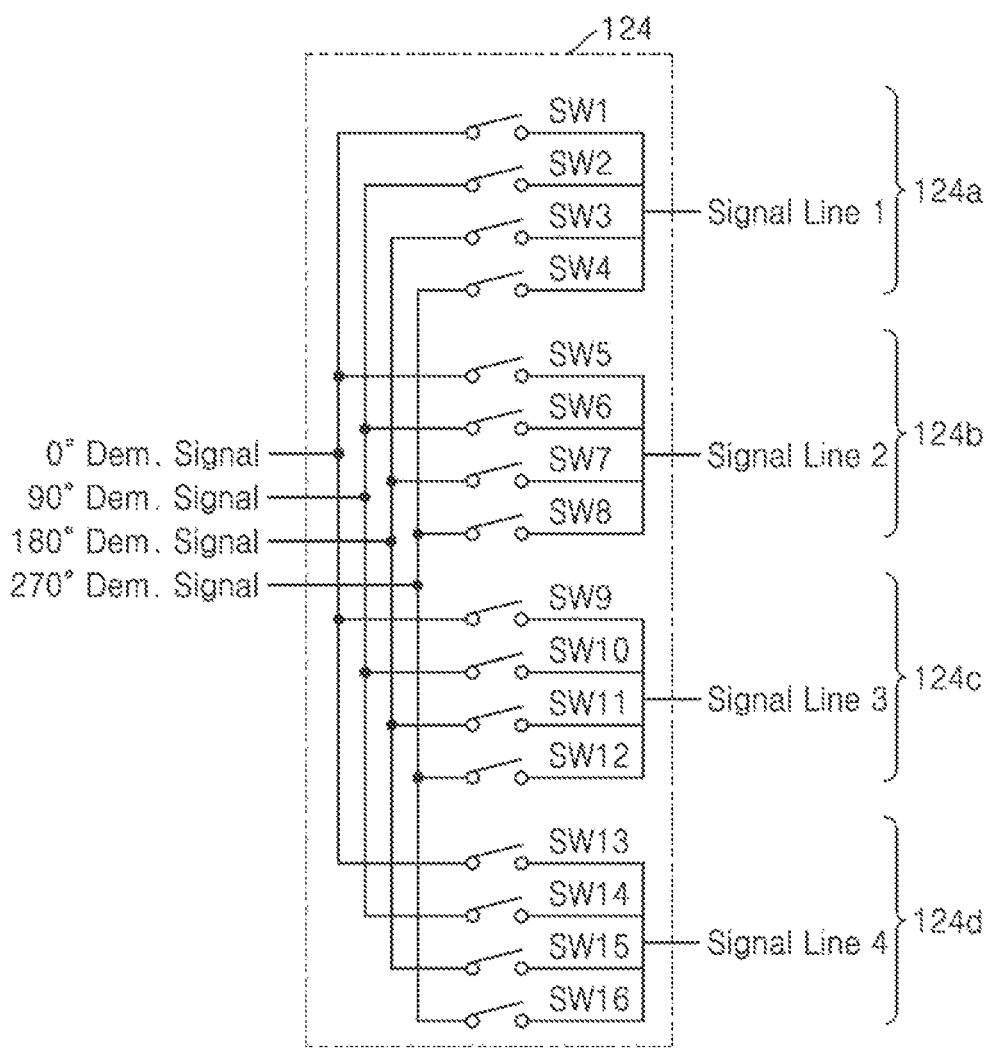
FIG. 5A is a first selection circuit according to an example embodiment.
Figure 5B:
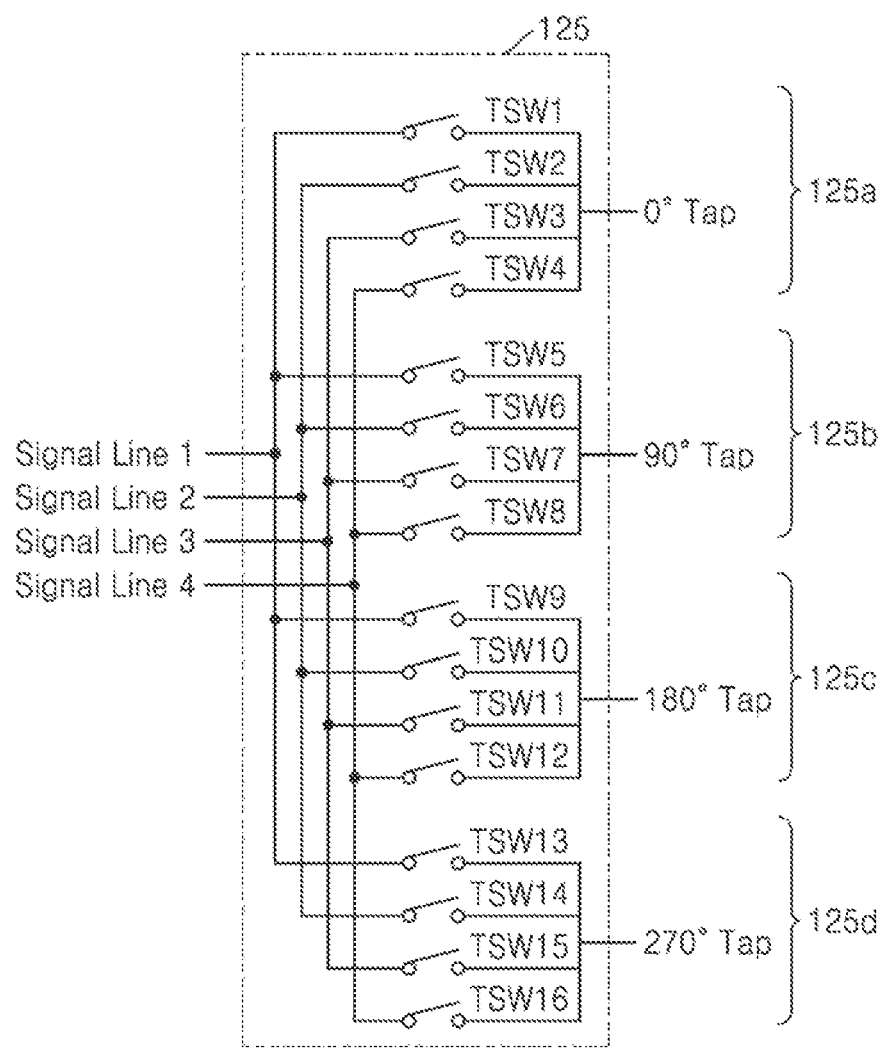
FIG. 5B is a second selection circuit according to an example embodiment.

FIG. 5A is a first selection circuit according to an example embodiment, and FIG. 5B is a second selection circuit according to an example embodiment.

Referring to FIG. 5A, an example of a first selection circuit 124 disposed between the buffer circuit and the demodulation clock generation circuit is shown.

The first selection circuit 124 may include a plurality of first selection switches SW1, . . . , SW16. The first selection circuit 124 may include a first signal line switch group 124a connected to the first signal line Signal Line 1. The first selection circuit 124 may include a second signal line switch group 124b connected to the second signal line Signal Line 2. The first selection circuit 124 may include a third signal line switch group 124c connected to the third signal line Signal Line 3. The first selection circuit 124 may include a fourth signal line switch group 124d connected to the fourth signal line Signal Line 4. Hereinafter, for convenience, a first selection switch may be also described as a switch.

The first signal line switch group 124a may include the first switch SW1 connected between the first demodulation clock signal 0° Dem. Signal and the first signal line Signal Line 1, the second switch SW2 connected between the second demodulation clock signal 90° Dem. Signal and the first signal line Signal Line 1, the third switch SW3 connected between the third demodulation clock signal 180° Dem. Signal and the first signal line Signal Line 1, and the fourth switch SW4 connected between the fourth demodulation clock signal 270° Dem. Signal and the first signal line Signal Line 1.

The second signal line switch group 124b may include the fifth switch SW5 connected between the first demodulation clock signal 0° Dem. Signal and the second signal line Signal Line 2, the sixth switch SW6 connected between the second demodulation clock signal 90° Dem. Signal and the second signal line Signal Line 2, the seventh switch SW7 connected between the third demodulation clock signal 180° Dem. Signal and the second signal line Signal Line 2, and the eighth switch SW8 connected between the fourth demodulation clock signal 270° Dem. Signal and the second signal line Signal Line 2.

The third signal line switch group 124c may include the ninth switch SW9 connected between the first demodulation clock signal 0° Dem. Signal and the third signal line Signal Line 3, the tenth switch SW10 connected between the second demodulation clock signal 90° Dem. Signal and the third signal line Signal Line 3, the eleventh switch SW11 connected between the third demodulation clock signal 180° Dem. Signal and the third signal line Signal Line 3, and the twelfth switch SW12 connected between the fourth demodulation clock signal 270° Dem. Signal and the third signal line Signal Line 3.

The fourth signal line switch group 124d may include the thirteenth switch SW13 connected between the first demodulation clock signal 0° Dem. Signal and the fourth signal line Signal Line 4, the fourteenth switch SW14 connected between the second demodulation clock signal 90° Dem. Signal and the fourth signal line Signal Line 4, the fifteenth switch SW15 connected between the third demodulation clock signal 180° Dem. Signal and the fourth signal line Signal Line 4, and the sixteenth switch SW16 connected between the fourth demodulation clock signal 270° Dem. Signal and the fourth signal line Signal Line 4.

A switch connected between a demodulation clock signal and a signal line may refer to a switch connected between an output terminal from which a demodulation clock signal is output and one end of the signal line.

According to an example, the switch controller 123 of FIG. 4A controlling the first switch SW1 to the sixteenth switch SW16 may be connected to the first selection circuit 124. The switch controller 123 may control whether or not the first switch SW1 to the sixteenth switch SW16 are turned on and turn-on timing.

According to an example, the switch controller 123 may control turning on the first switch SW1 and turning off the second to fourth switches SW2 and SW4 in the first section. The switch controller 123 may control turning on the sixth switch SW6 and turning off the fifth switch SW5, the seventh switch SW7, and the eighth switch SW8 in the first section. The switch controller 123 may control turning on the eleventh switch SW11 and turning off the ninth switch SW9, the tenth switch SW10, and the twelfth switch SW12 in the first section. The switch controller 123 may control turning on the sixteenth switch SW16 and turning off the thirteenth switch SW13 to fifteenth switch SW15 in the first section. Through this, in the first section, the first demodulation clock signal 0° Dem. Signal may be connected to the first signal line Signal Line 1, the second demodulation clock signal 90° Dem. Signal may be connected to the second signal line Signal Line 2. the third demodulation clock signal 180° Dem. Signal may be connected to the third signal line Signal Line 3, and the fourth demodulation clock signal 270° Dem. Signal may be connected to the fourth signal line Signal Line 4.

When the first section ends and the second section begins, the switch controller 123 may control the first switch SW1, the third switch SW3, and the fourth switch SW4 to turn off and the second switch SW2 to turn on. In the second section, the switch controller 123 may turn on the seventh switch SW7 and turn off the fifth switch SW5, the sixth switch SW6, and the eighth switch SW8. In the second section, the switch controller 123 may control the twelfth switch SW12 to turn on and the ninth switch SW9, the tenth switch SW10, and the eleventh switches SW11 to turn off. In the second section, the switch controller 123 may control the thirteenth switch SW13 to turn on and the fourteenth switch SW14 to the sixteenth switch SW16 to turn off. Through this, in the second section, the first demodulation clock signal 0° Dem. Signal may be connected to the fourth signal line Signal Line 4, the second demodulation clock signal 90° Dem. Signal may be connected to the first signal line Signal Line 1, the third demodulation clock signal 180° Dem. Signal may be connected to the second signal line Signal Line 2, and the fourth demodulation clock signal 270° Dem. Signal may be connected to the third signal line Signal Line 3.

When the second section ends and the third section begins, the switch controller 123 may control the first switch SW1, the second switch SW2, and the fourth switch SW4 to turn off and the third switch SW3 to turn on. In the third section, the switch controller 123 may control the eighth switch SW8 to turn on and the fifth to seventh switches SW5 to SW7 to turn off. In the third section, the switch controller 123 may control the ninth switch SW9 to turn on and the tenth to twelfth switches SW10 to SW12 to turn off. In the third section, the switch controller 123 may control the fourteenth switch SW14 to turn on and the thirteenth switch SW13, the fifteenth switch SW15, and the sixteenth switch SW16 to turn off. Through this, in the third section, the first demodulation clock signal 0° Dem. Signal may be connected to the third signal line Signal Line 3, the second demodulation clock signal 90° Dem. Signal may be connected to the fourth signal line Signal Line 4, the third demodulation clock signal 180° Dem. Signal may be connected to the first signal line Signal Line 1, and the fourth demodulation clock signal 270° Dem. Signal may be connected to the second signal line Signal Line 2.

When the third section ends and the fourth section begins, the switch controller 123 may control the first to the third switches SW1 to SW3 to turn off and the fourth switch SW4 to turn on. In the fourth section, the switch controller 123 may control the fifth switch SW5 to turn on and the sixth to eighth switches SW8 to turn off. In the fourth section, the switch controller 123 may control the tenth switch SW10 to turn on and the ninth switch SW9, the eleventh switch SW11, and the twelfth switch SW12 to turn off. In the fourth section, the switch controller 123 may control the fifteenth switch SW15 to turn on and the thirteenth switch SW13, the fourteenth switch SW14, and the sixteenth switch SW16 to turn off. Through this, in the fourth section, the first demodulation clock signal 0° Dem. Signal may be connected to the second signal line Signal Line 2, the second demodulation clock signal 90° Dem. Signal may be connected to the third signal line Signal Line 3, the third demodulation clock signal 180° Dem. Signal may be connected to the fourth signal line Signal Line 4, and the fourth demodulation clock signal 270° Dem. Signal may be connected to the first signal line Signal Line 1.

By disposing and controlling the first selection circuit so that the demodulation clock signals having four phases each experience all signal lines for the same time during integration time, the first to fourth signal lines may be shared in all time sections.

Referring to FIG. 5B, an example of a second selection circuit disposed between the buffer circuit and the pixel array is shown.

A second selection circuit 125 may include a plurality of second selection switches TSW1, . . . , TSW16. The second selection circuit 125 may include a first tap switch group 125*a* connected to the first signal line Signal Line 1. The second selection circuit 125 may include a second tap switch group 125*b* connected to the second signal line Signal Line 2. The second selection circuit 125 may include a third tap switch group 125*c* connected to the third signal line Signal Line 3. The second selection circuit 125 may include a fourth tap switch group 125*d* connected to the fourth signal line Signal Line 4. Hereinafter, for convenience, a second selection switch may be also described as a tap switch.

The first tap switch group 125*a* may include the first tap switch TSW1 connected between the first tap 0° Tap and the first signal line Signal Line 1, the second tap switch TSW2 connected between the first tap 0° Tap and the second signal line Signal Line 2, the third tap switch TSW3 connected between the first tap 0° Tap and the third signal line Signal Line 3, and the fourth tap switch TSW4 connected between the first tap 0° Tap and the fourth signal line Signal Line 4.

The second tap switch group 125*b* may include the fifth tap switch TSW5 connected between the second tap 90° Tap and the first signal line Signal Line 1, the sixth tap switch TSW6 connected between the second tap 90° Tap and the second signal line Signal Line 2, the seventh tap switch TSW7 connected between the second tap 90° Tap and the third signal line Signal Line 3, and the eighth tap switch TSW8 connected between the second tap 90° Tap and the fourth signal line Signal Line 4.

The third tap switch group 125c may include the ninth tap switch TSW9 connected between the third tap 180° Tap and the first signal line Signal Line 1, the tenth tap switch TSW10 connected between the third tap 180° Tap and the second signal line Signal Line 2, the eleventh tap switch TSW11 connected between the third tap 180° Tap and the third signal line Signal Line 3, and the twelfth tap switch TSW12 connected between the third tap 180° Tap and the fourth signal line Signal Line 4.

The fourth tap switch group 125d may include the thirteenth tap switch TSW13 connected between the fourth tap 270° Tap and the first signal line Signal Line 1, the fourteenth tap switch TSW14 connected between the fourth tap 270° Tap and the second signal line Signal Line 2, the fifteenth tap switch TSW15 connected between the fourth tap 270° Tap and the third signal line Signal Line 3, and the sixteenth tap switch TSW16 connected between the fourth tap 270° Tap and the fourth signal line Signal Line 4.

According to an example, a switch controller (123 of FIG. 4A) controlling the first tap switch TSW1 to the sixteenth tap switch TSW16 may be connected to the second selection circuit 125. The switch controller 123 may control whether the first tap switch TSW1 to the sixteenth tap switch TSW16 are turned on and turn-on timing.

Depending on which signal line is connected to the demodulation clock signal having a phase, the switch controller 123 may control whether to turn on the first tap switch TSW1 to the sixteenth tap switch TSW16 so as to control outputs to the output tap corresponding to the phase.

The first selection circuit 124 and the second selection circuit 125 shown in FIGS. 5A and 5B are provided as examples, and the first selection circuit 124 and the second selection circuit 125 may be provided as various switch array circuits.

FIGS. 6A to 6G are diagrams for explaining arrangement positions of a first selection circuit and a second selection circuit according to an example embodiment. The switch controller may be omitted for convenience of description.

Figure 6A:
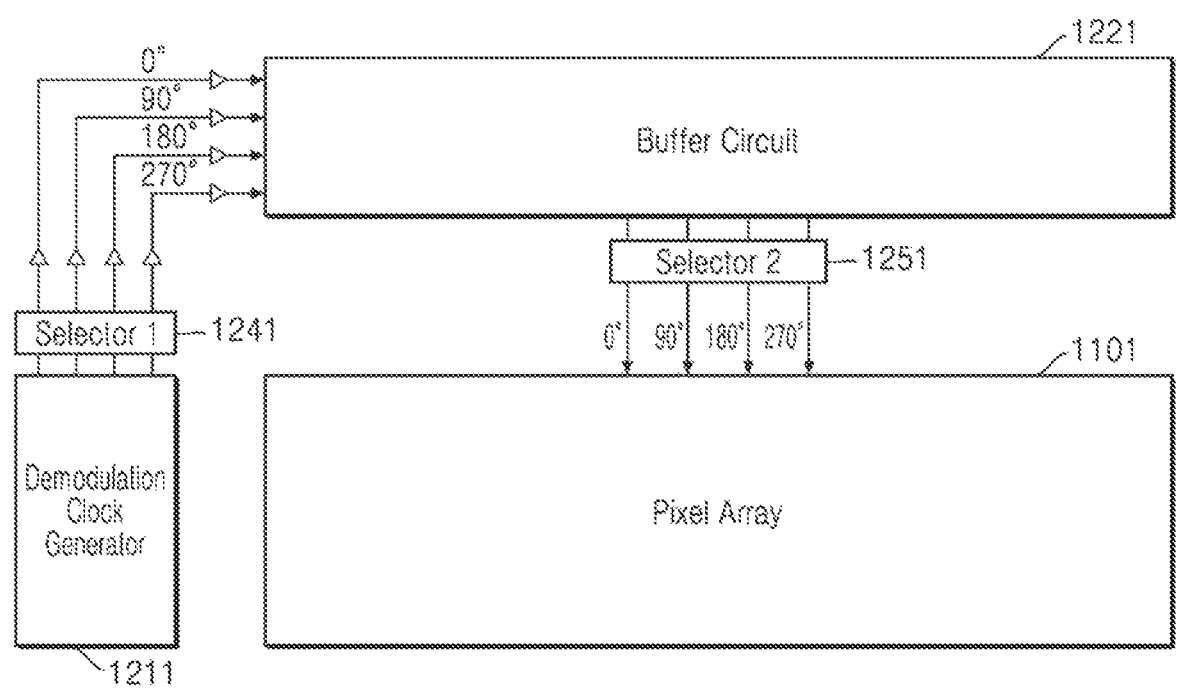
FIGS. 6A, 6B, 6C, 6D, 6E, 6F and 6G are diagrams for explaining arrangement positions of a first selection circuit and a second selection circuit according to an example embodiment.

Referring to FIG. 6A, an example in which the first selection circuit 1241 is disposed between the output terminal of a demodulation clock generation circuit 1211 and a buffer circuit 1221, and a second selection circuit 1251 is disposed between the buffer circuit 1221 and a pixel array 1101 is shown.

Figure 6B:
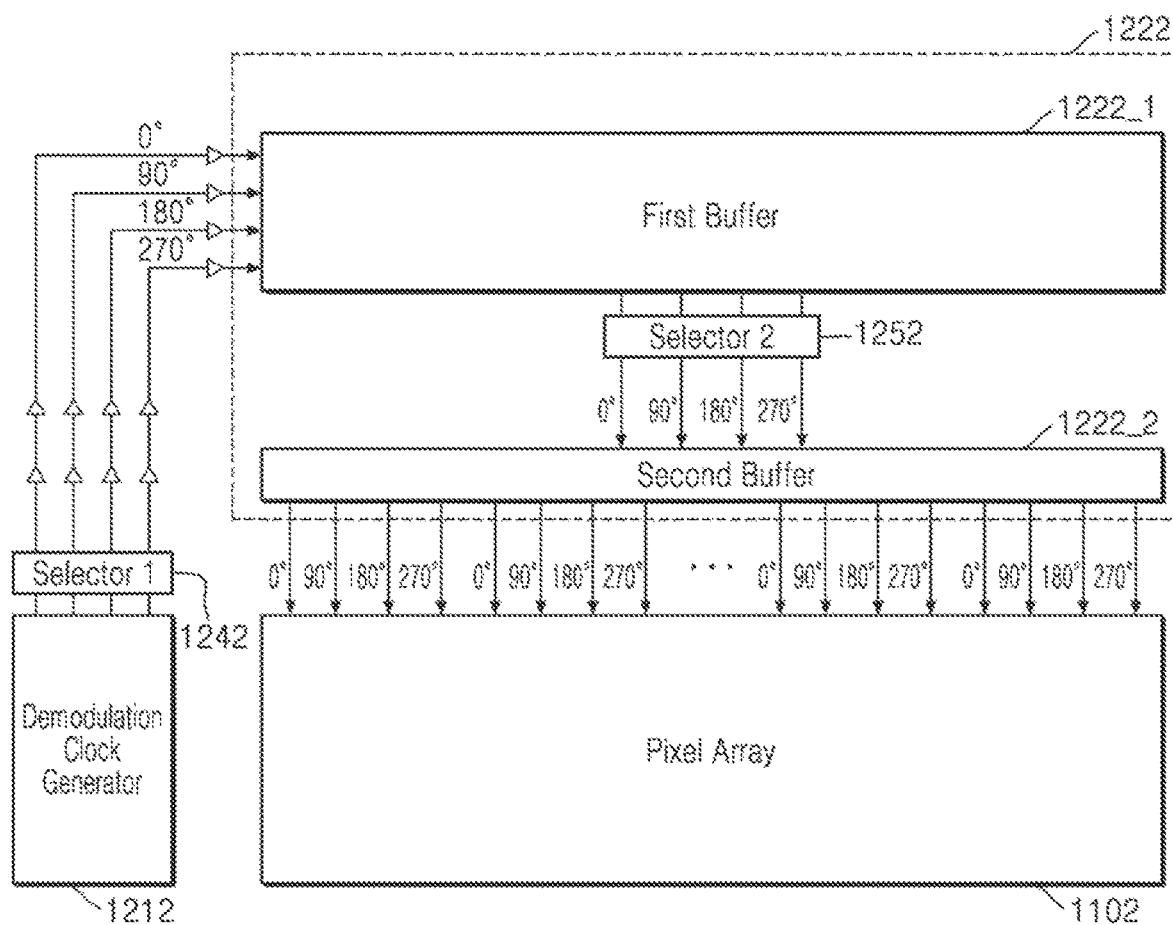

Referring to FIG. 6B, a buffer circuit 1222 may include a first buffer 1222_1 and a second buffer 1222_2. A first selection circuit 1242 may be disposed between the output terminal of the demodulation clock generation circuit 1212 and the buffer circuit 1222, and a second selection circuit 1252 may be disposed between the first buffer 1222_1 and the second buffer 1222_2. Referring to FIG. 6B, the buffer circuit 1222 may include the first buffer 1222_1 and the second buffer 1222_2 to drive a plurality of pixel arrays. Referring to FIG. 6B, the second selection circuit 1252 may be disposed at an input terminal of the second buffer 1222_2 that is relatively vulnerable to mismatch of signal lines. According to an example, the first buffer 1222_1 may be a driving buffer, and the second buffer 1222_2 may be a buffer tree. According to an example, the second buffer 1222_2 may be the buffer tree for applying a demodulation signal to each of a plurality of unit pixels included in the pixel array 1102. According to an example, the second buffer 1222_2 may be connected to the output of the first buffer 1222_1.

Figure 6C:
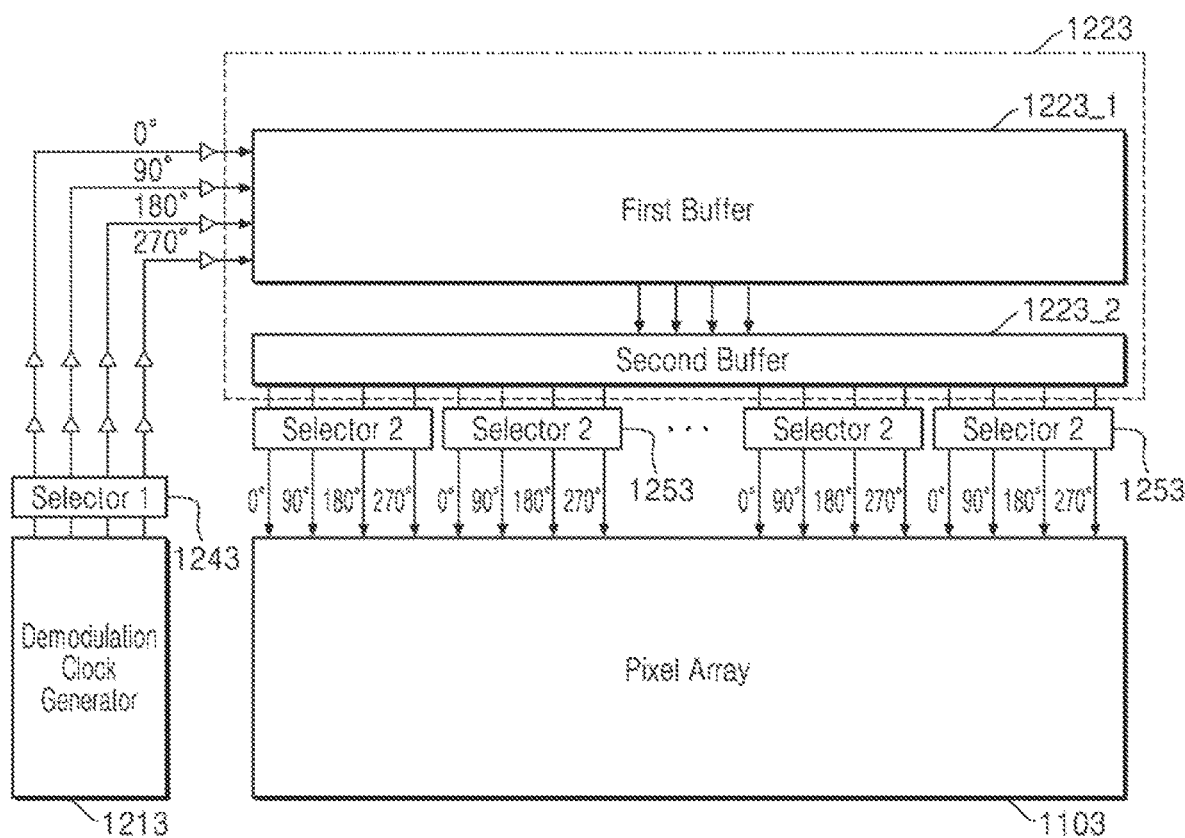

Referring to FIG. 6C, a buffer circuit 1223 may include a first buffer 1223_1 and a second buffer 1223_2. A first selection circuit 1243 may be disposed between the output terminal of a demodulation clock generation circuit 1213 and the buffer circuit 1223, and a second selection circuit 1253 may be disposed between the second buffer 1223_2 and a pixel array 1103. Referring to FIG. 6C, a plurality of second selection circuits 1253 may be provided. Referring to FIG. 6C, there is an effect capable of removing the mismatch of the signal line finally input to the pixel array 1103.

Figure 6D:
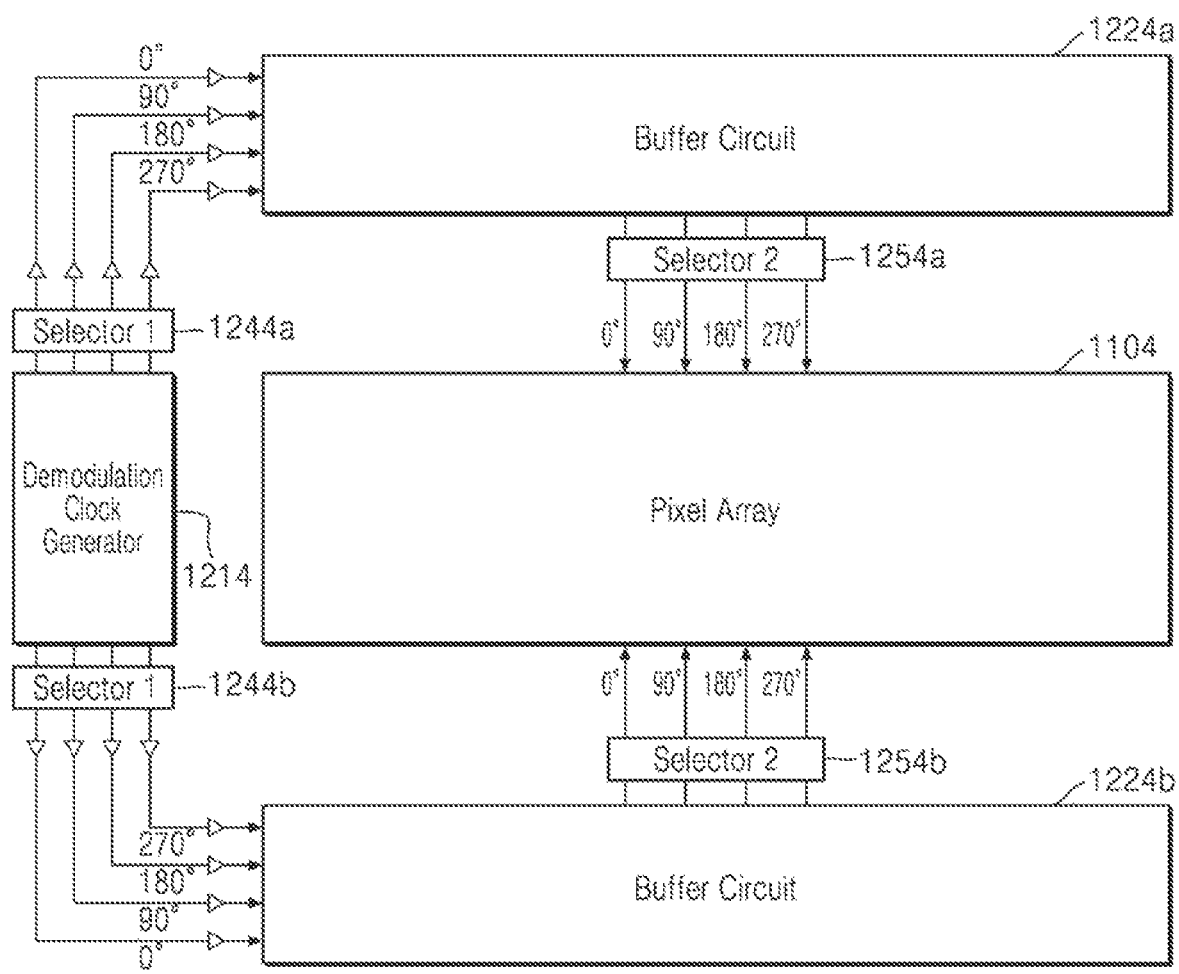
Figure 6E:
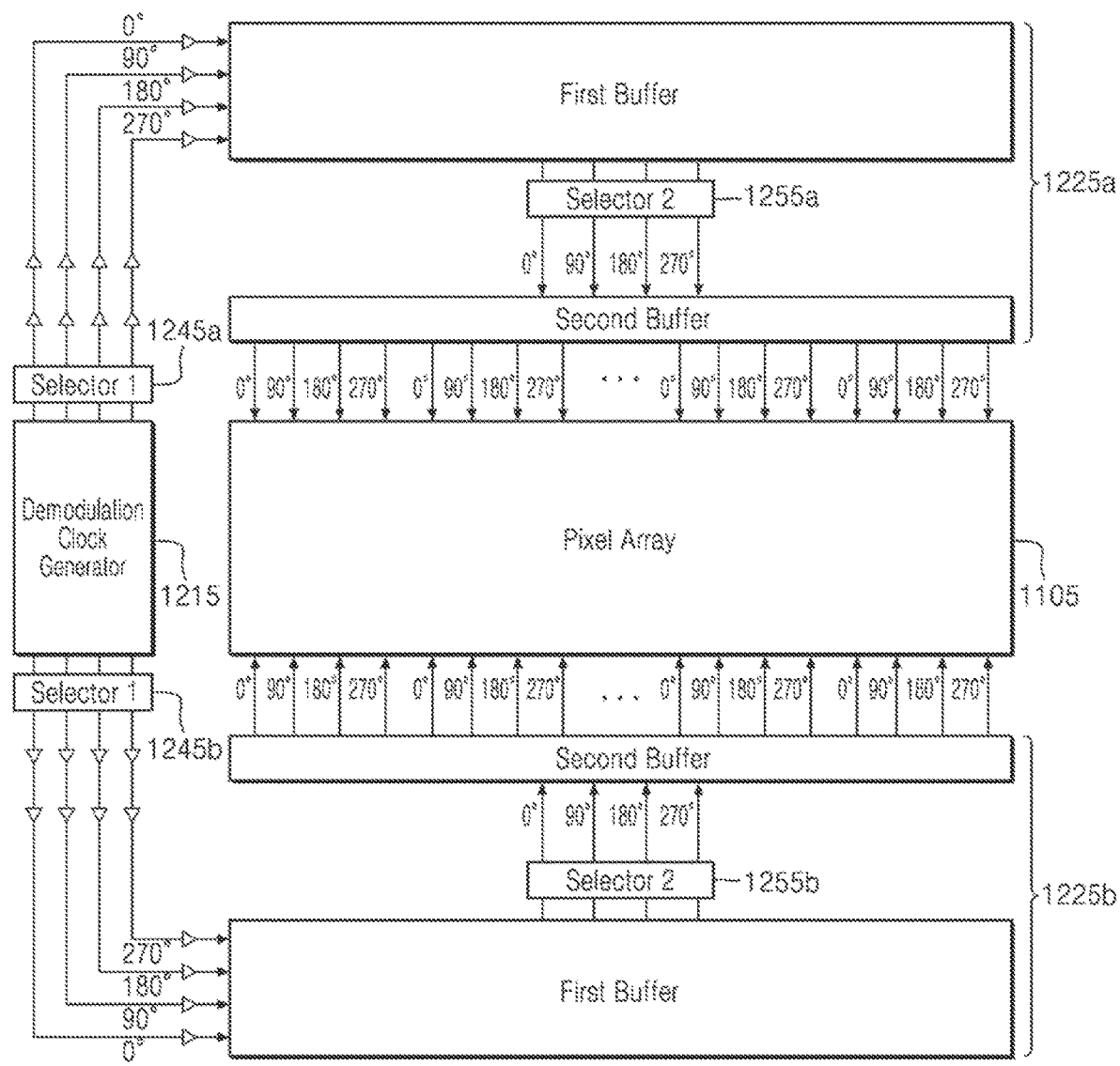

Referring to FIGS. 6D to 6E, an example of an image sensor in which buffer circuits are respectively provided in the upper and lower directions of the pixel array is shown.

Figure 6F:
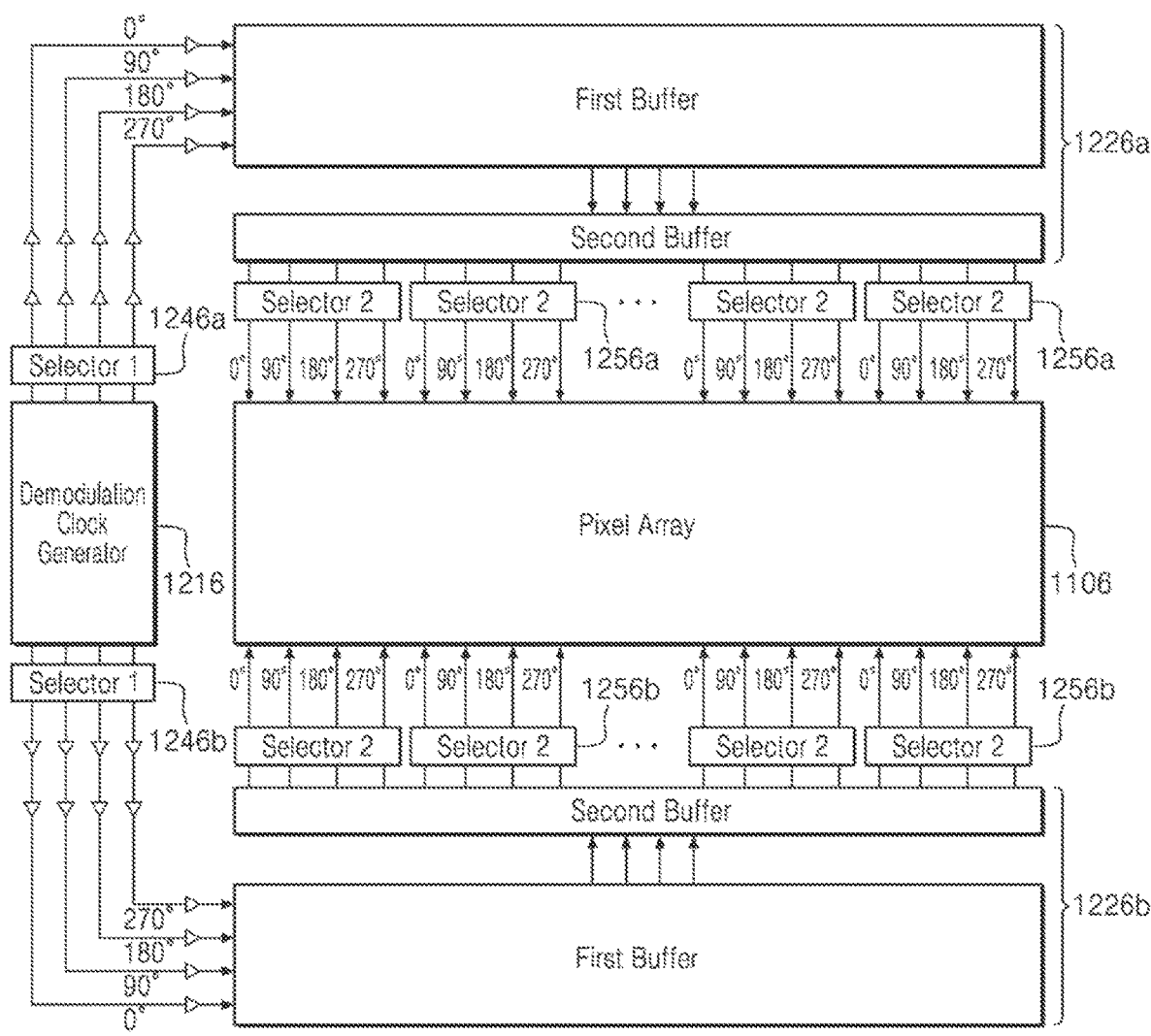

FIG. 6D is an example in which buffer circuits 1224a and 1224b are respectively provided in the upper and lower directions of the pixel array 1104. Accordingly, two first selection circuits 1244a and 1244b and two second selection circuits 1254a and 1254b may be provided. FIG. 6E is an example in which the buffer circuits 1225a and 1225b are respectively provided in the upper and lower directions of the pixel array 1105. Accordingly, two first selection circuits 1245a and 1245b and two second selection circuits 1255a and 1255b may be provided. FIG. 6F is an example in which buffer circuits 1226a and 1226b are respectively provided in the upper and lower directions of the pixel array 1106. Accordingly, two first selection circuits 1246a and 1246b and two second selection circuits 1256a and 1256b may be provided.

Figure 6G:
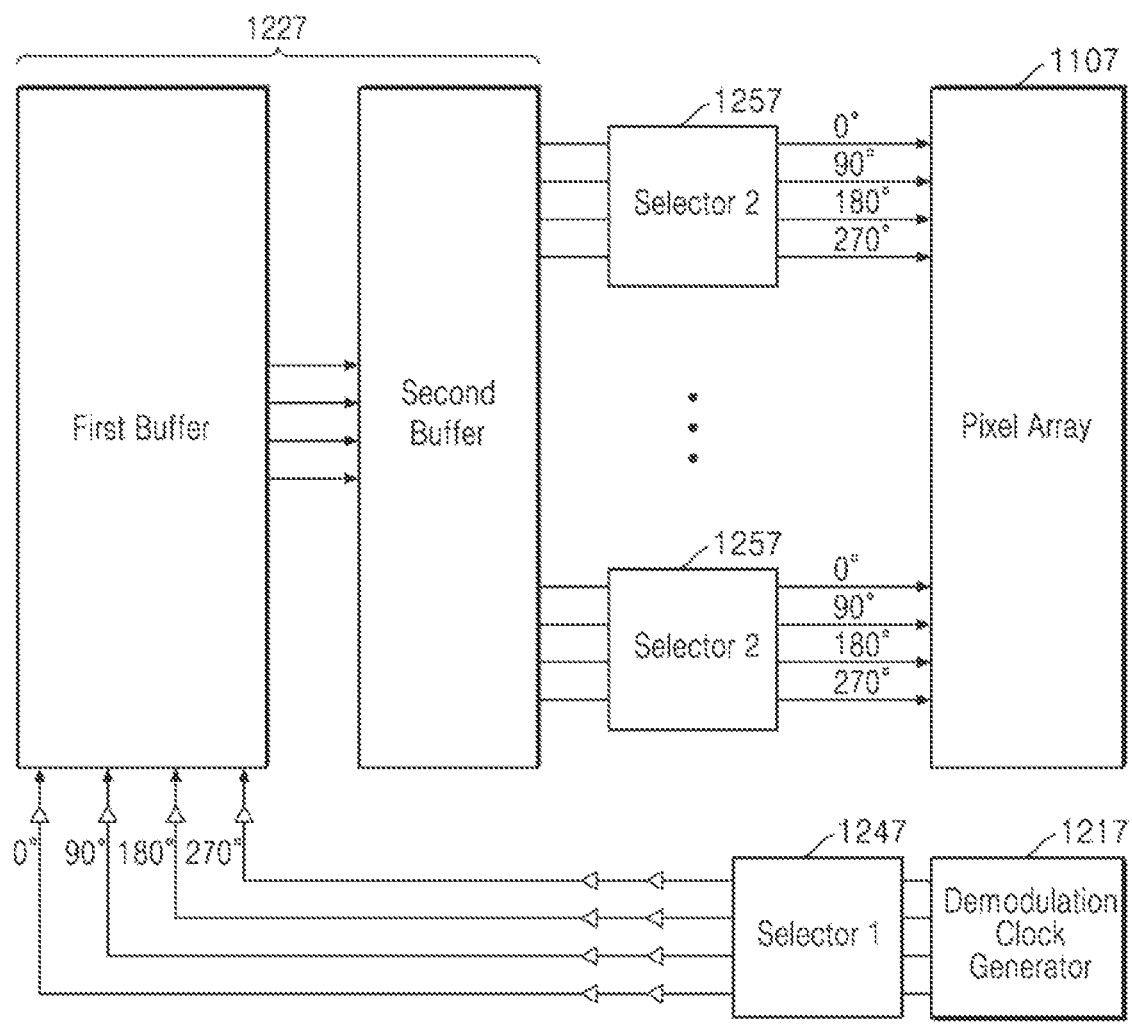

Referring to FIG. 6G, an example in which the buffer circuit 1227 is arranged to input the demodulation clock signal to the pixel array 1107 in the row direction is shown. Also, in such an example embodiment, a first selection circuit 1247 may be disposed between the demodulation clock generation circuit 1217 and the buffer circuit 1227, and a second selection circuit 1257 may be disposed between the buffer circuit 1227 and the pixel array 1107.

According to example embodiments, a mismatch in the phase and duty of the demodulation signal in the distance sensor may be removed by sharing the signal line. According to example embodiments, a path from the clock generation circuit generating the demodulation signal to the input of the pixel array during the integration time may be shared. According to example embodiments, a selection circuit composed of a switch array may be disposed at the block output generating the demodulation signal and at the input of the pixel array. According to example embodiments, during the integration time, the phase of the demodulation signal may be shared during an odd section or an even section. According to example embodiments, the operation of the selection circuit may be controlled based on the number of phases used, the number of taps, and the like.

FIGS. 4C to 6G disclose example embodiments of a 4-tap structure, and FIGS. 7 to 9E disclose example embodiments of a 2-tap structure. Example embodiments may be applied to all distance sensors using two or more taps as well as the above-described examples.

Figure 7:
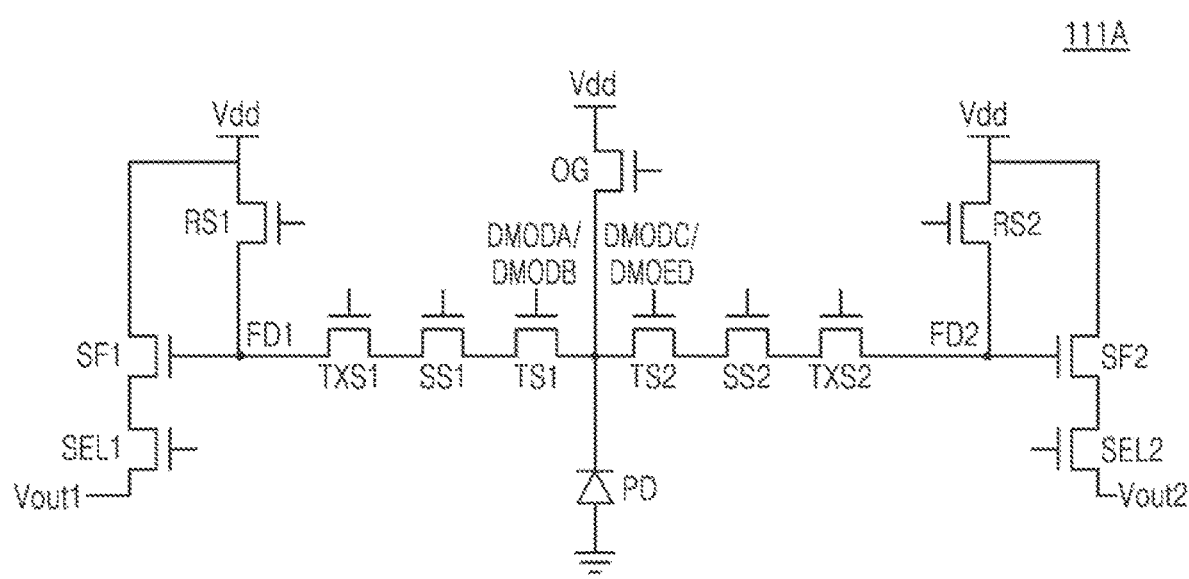
FIG. 7 is a diagram for explaining an example embodiment of a structure of a unit pixel shown in FIG. 2.

FIG. 7 is a diagram for explaining an example embodiment of a structure of a unit pixel shown in FIG. 2

As shown in FIG. 7, unit pixel 111A may have a 2-tap structure. The 2-tap structure refers to a structure in which one unit pixel 111A includes two taps, and the tap may refer to a unit component capable of transferring photoelectric charges generated and accumulated in the unit pixel 111A by distinguishing between the photoelectric charges by phase as an external optical signal is irradiated.

An image sensor (e.g., 14 in FIG. 2) including unit pixels 111A of a 2-tap structure may implement a method of transmitting pixel signals with respect to phases of 0°, 90°, 180°, and 270° using two taps. For example, when generating the first pixel signal Vout1 with a phase of 0° based on the first tap of the unit pixel 111A in an even frame (first frame), the second tap may generate a second pixel signal Vout2 with a 180° phase, in an odd frame (second frame), a first tap may generate a first pixel signal Vout1 with a phase of 90°, and the second tap may generate a second pixel signal Vout2 with a 270° phase.

Referring to FIG. 7, the unit pixel 111A may include a photodiode PD, an overflow gate OG, and transfer transistors TS1 and TS2, storage transistors SS1 and SS2, tap transfer transistors TXS1 and TXS2, reset transistors RS1 and RS2, source followers SF1 and SF2, and select transistors SEL1 and SEL2. According to an example embodiment, at least one of the overflow gate OG, the storage transistors SS1 and SS2, the tap transfer transistors TXS1 and TXS2, reset transistors RS1 and RS2, source followers SF1 and SF2, and select transistors SEL1 and SEL2 may be omitted.

The first transfer transistor TS1 may transfer the charge generated by the photodiode PD to the first storage transistor SS1 based on the first demodulation signal DEMODA in an even frame, and may transfer the charge generated by the photodiode PD to the first storage transistor SS1 based on the second demodulation signal DEMODB in an odd frame. The second transfer transistor TS2 may transfer the charge generated by the photodiode PD to the second storage transistor SS2 based on the third demodulation signal DEMODC in an even frame, and may transfer the charge generated by the photodiode PD to the second storage transistor SS2 based on to the fourth demodulation signal DEMODD in an odd frame. The first to fourth demodulation signals DEMODA to DEMODD may be included in the demodulation signals DEMOD of FIG. 2 and may be signals having the same frequency and duty ratio and different phases. The first to fourth demodulation signals DEMODA to DEMODD may have a phase difference of 90 degrees from each other. For example, based on the first demodulation signal DEMODA, when the first demodulation signal DEMODA has a phase of 0°, the second demodulation signal DEMODB may have a phase of 90°, the third demodulation signal DEMODC may have a phase of 180°, and the fourth demodulation signal DEMODD may have a phase of 270°.

The unit pixel 111A may accumulate photoelectric charges during the integration time in an even frame and may output a first pixel signal Vout1 and a second pixel signal Vout2 generated based on the accumulation result to a readout circuit (e.g., 130 of FIG. 2). In addition, the unit pixel 111A may accumulate photoelectric charges during the integration time in the odd frame and may output the first pixel signal Vout1 and the second pixel signal Vout2 generated based on the accumulation result to the readout circuit 130.

Figure 8:
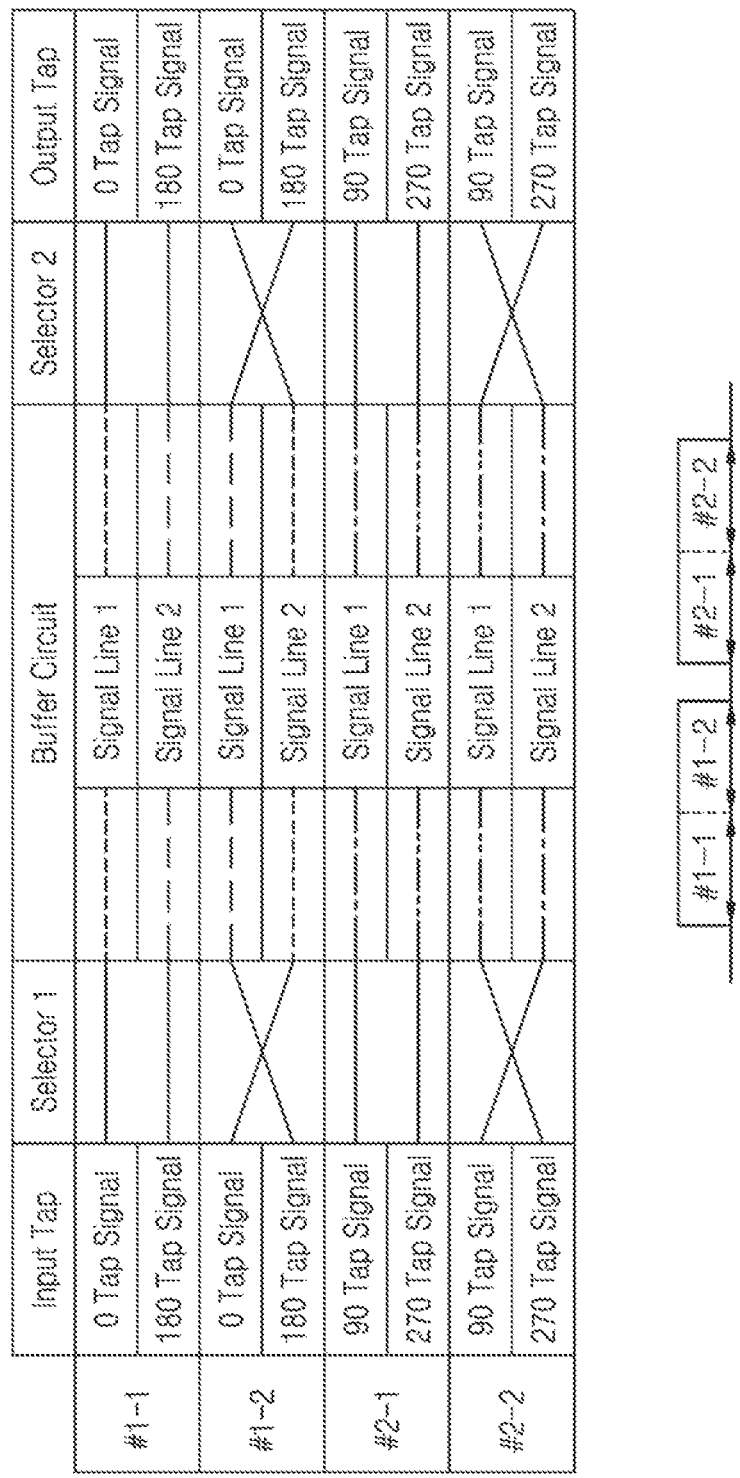
FIG. 8 is a diagram for explaining a method of matching signal lines connected to unit pixels according to an example embodiment.

FIG. 8 is a diagram for explaining a method of matching signal lines connected to unit pixels. In the description of FIG. 8, the description already given with reference to FIG. 4C is omitted.

Referring to FIG. 8, an example embodiment in which a demodulation signal having four phases is applied to a unit pixel having a 2-tap structure is shown.

Because the unit pixel has a 2-tap structure, two signal lines may be included in the buffer circuit, and two demodulation clock signals may be provided for each frame. To provide a demodulation clock signal having four phases to a unit pixel having a 2-tap structure, two frames may be required. According to an example, the first frame may be divided into two equal sections #1-1 and #1-2, and the second frame may also be divided into two equal sections #2-1 and #2-2.

In the first period #1-1 of the first frame, the first demodulation clock signal 0 tap signal may be connected to the first signal line Signal Line 1 and output as the first tap signal. In the first section #1-1 of the first frame, the second demodulation clock signal 180 tap signal may be connected to the second signal line Signal Line 2 and output as the second tap signal.

In the second section #1-2 of the first frame, the first demodulation clock signal 0 tap signal may be connected to the second signal line Signal Line 2 and output as the first tap signal. In the second section #1-2 of the first frame, the second demodulation clock signal 180 tap signal may be connected to the first signal line Signal Line 1 and output as the second tap signal.

In the first section #2-1 of the second frame, the third demodulation clock signal 90 tap signal may be connected to the first signal line Signal Line 1 and output as the first tap signal. In the first section #2-1 of the second frame, the fourth demodulation clock signal 270 tap signal may be connected to the second signal line Signal Line 2 and output as the second tap signal.

In the second section #2-2 of the second frame, the fourth demodulation clock signal 270 tap signal may be connected to the first signal line Signal Line 1 and output as the second tap signal. In the second section #2-2 of the second frame, the third demodulation clock signal 90 tap signal may be connected to the second signal line Signal Line 2 and output as the first tap signal.

Through this, during the integration time corresponding to the first frame and the second frame, the demodulation clock signals having 0°, 90°, 180°, and 270° share all of the plurality of signal lines for the same time, so that the duty cycle may be output evenly, thereby reducing the error.

FIGS. 9A to 9F are diagrams for explaining arrangement positions of a first selection circuit and a second selection circuit according to an example embodiment. According to an example, FIGS. 9A to 9F may be applied to a pixel array of pixels having a 2-tap structure. In the description of FIGS. 9A to 9F, components corresponding to those of FIGS. 6A to 6F may perform the same function.

Referring to FIGS. 9A to 9F, the demodulation clock generation circuit may output two demodulation clock signals. The two demodulation clock signals may be clock signals having a phase difference of 180° for each frame. According to an example, in the first frame, the demodulation clock generation circuit 1218 may output a demodulation clock signal having a phase of 0° and a demodulation clock signal having a phase of 180°, and in the second frame, the demodulation clock generation circuit 1218 may output a demodulation clock signal having a phase of 90° and a demodulation clock signal having a phase of 270°.

Figure 9A:
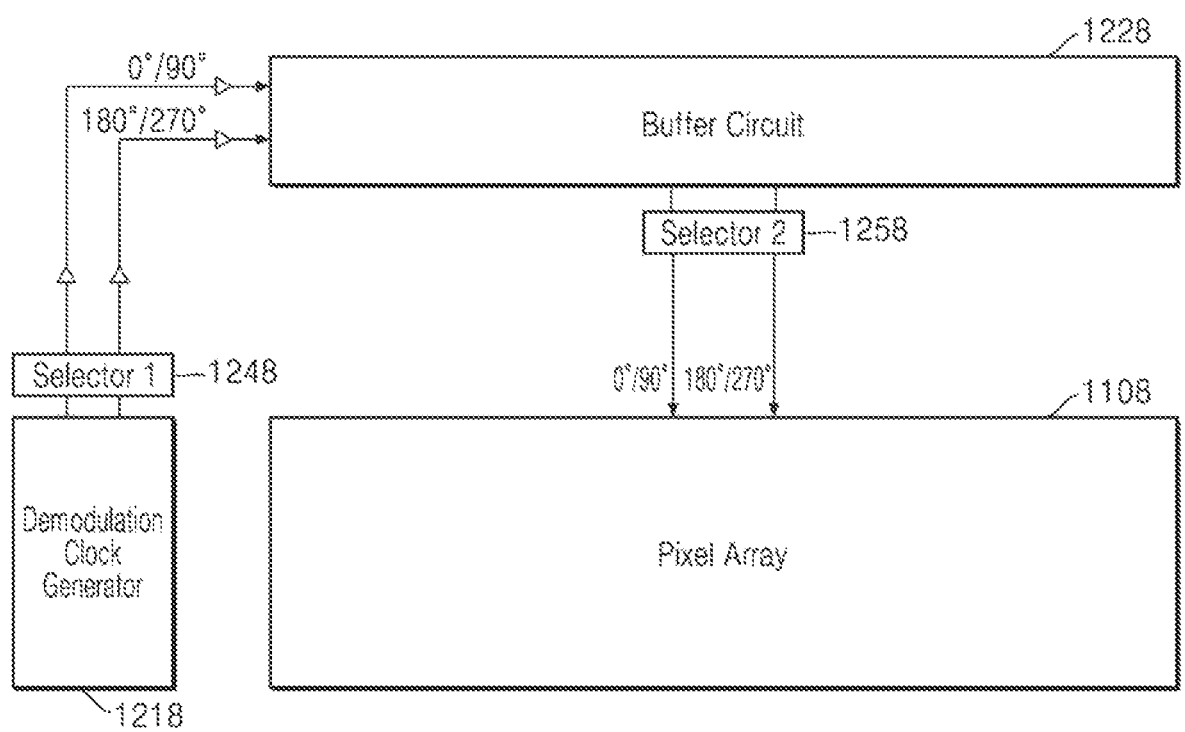
FIGS. 9A, 9B, 9C, 9D, 9E and 9F are diagrams for explaining arrangement positions of a first selection circuit and a second selection circuit according to an example embodiment.

Referring to FIG. 9A, an example in which a first selection circuit 1248 is disposed between the output terminal of a demodulation clock generation circuit 1218 and a buffer circuit 1228 and a second selection circuit 1258 is disposed between the buffer circuit 1228 and a pixel array 1108 is shown.

Figure 9B:
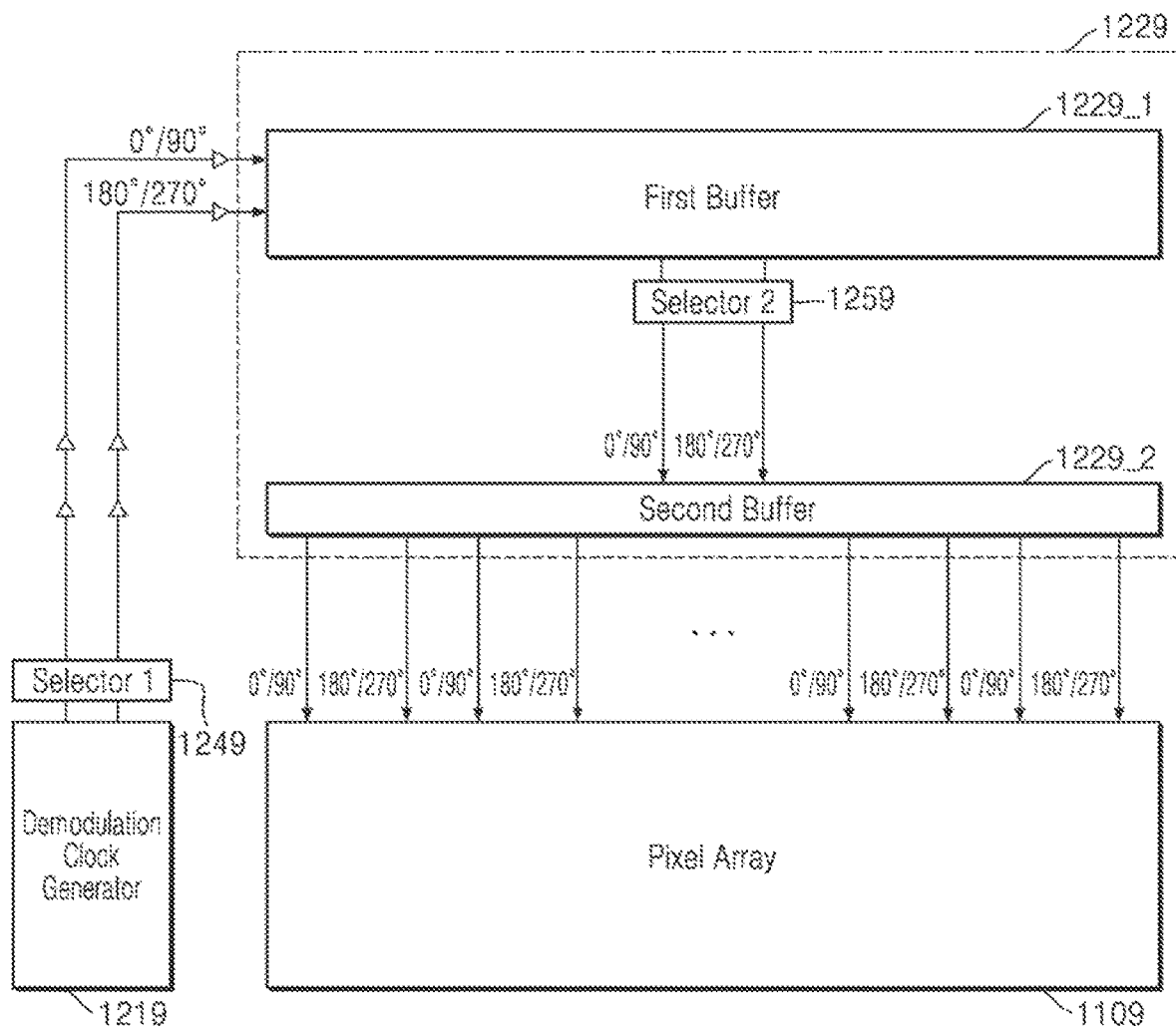

Referring to FIG. 9B, the buffer circuit 1229 may include a first buffer 1229_1 and a second buffer 1229_2. A first selection circuit 1249 may be disposed between the output terminal of the demodulation clock generation circuit 1219 and the buffer circuit 1229, and a second selection circuit 1259 may be disposed between the first buffer 1229_1 and the second buffer 1229_2. Referring to FIG. 9B, the first buffer 1229_1 and the second buffer 1229_2 may be included to drive a plurality of pixel arrays. Referring to FIG. 9B, the second selection circuit 1259 may be disposed at an input terminal of the second buffer 1229_2 that is relatively vulnerable to line mismatch. According to an example, the first buffer 1229_1 may be a driving buffer, and the second buffer 1229_2 may be a buffer tree.

Figure 9C:
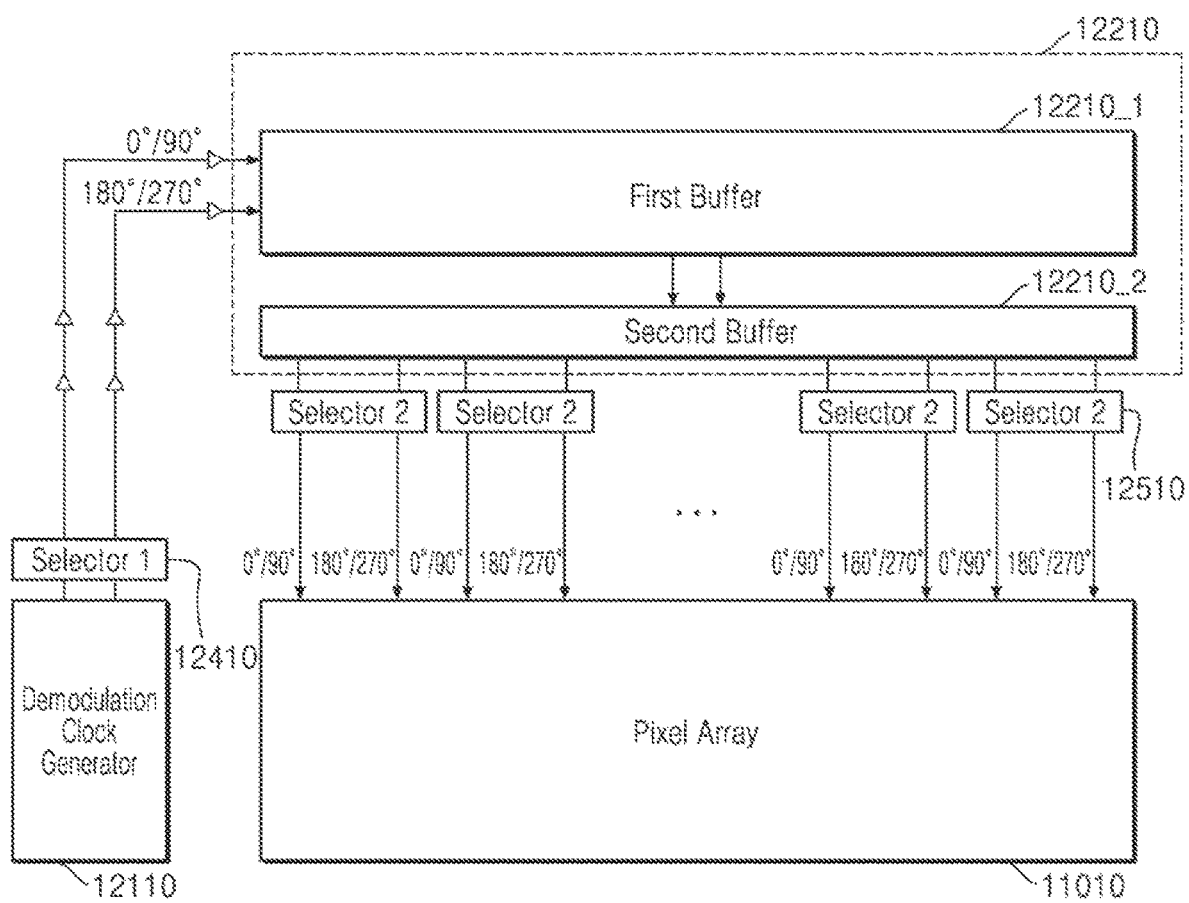

Referring to FIG. 9C, a first selection circuit 12410 may be disposed between the output terminal of a demodulation clock generation circuit 12110 and a buffer circuit 12210, and a second selection circuit 12510 may be disposed between a second buffer 12210_2 and a pixel array 11010. Referring to FIG. 9C, a plurality of second selection circuits 12510 may be provided. Referring to FIG. 9C, there is an effect capable of removing a mismatch of a signal line finally input to the pixel array 11010.

Figure 9D:
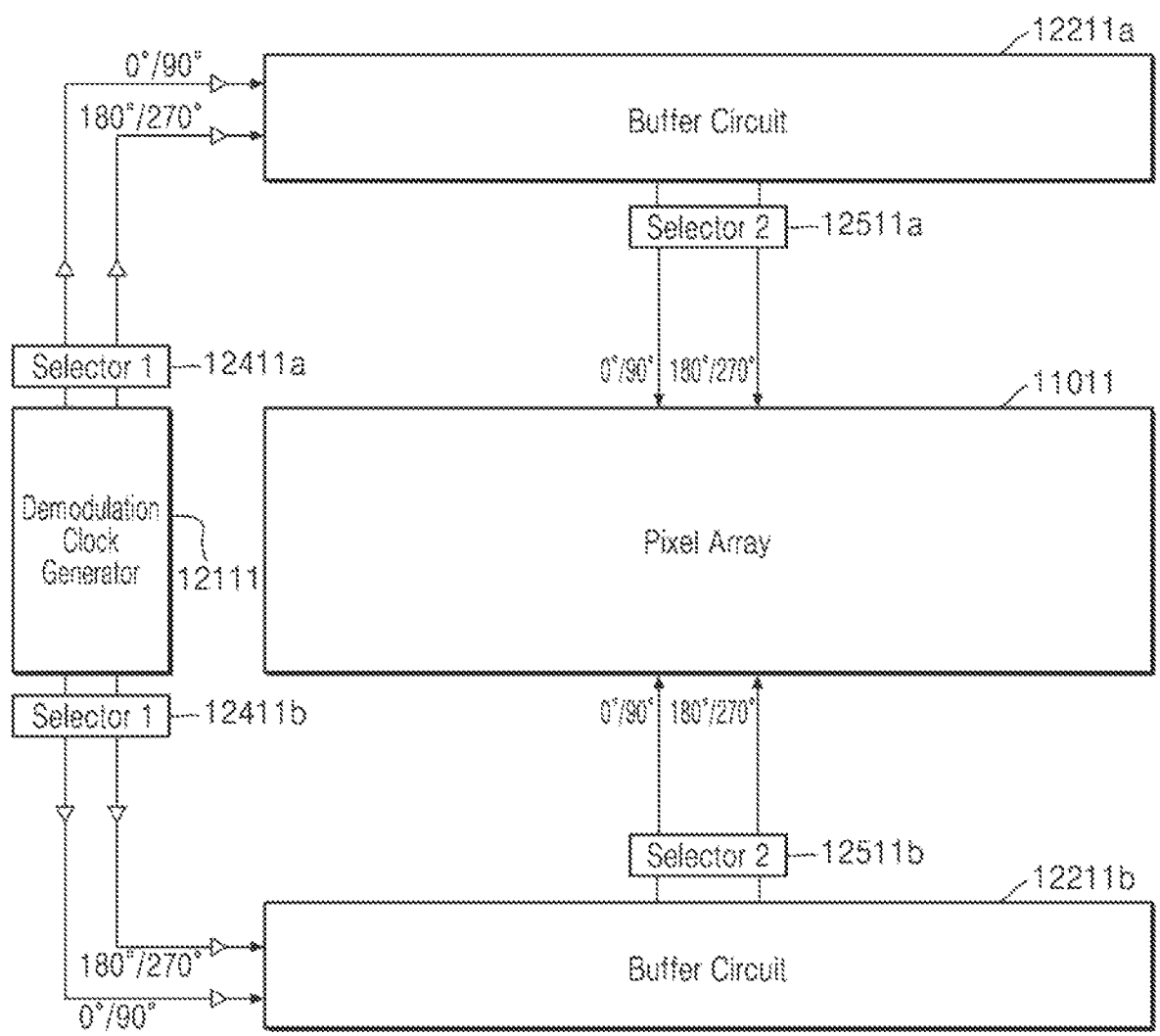
Figure 9E:
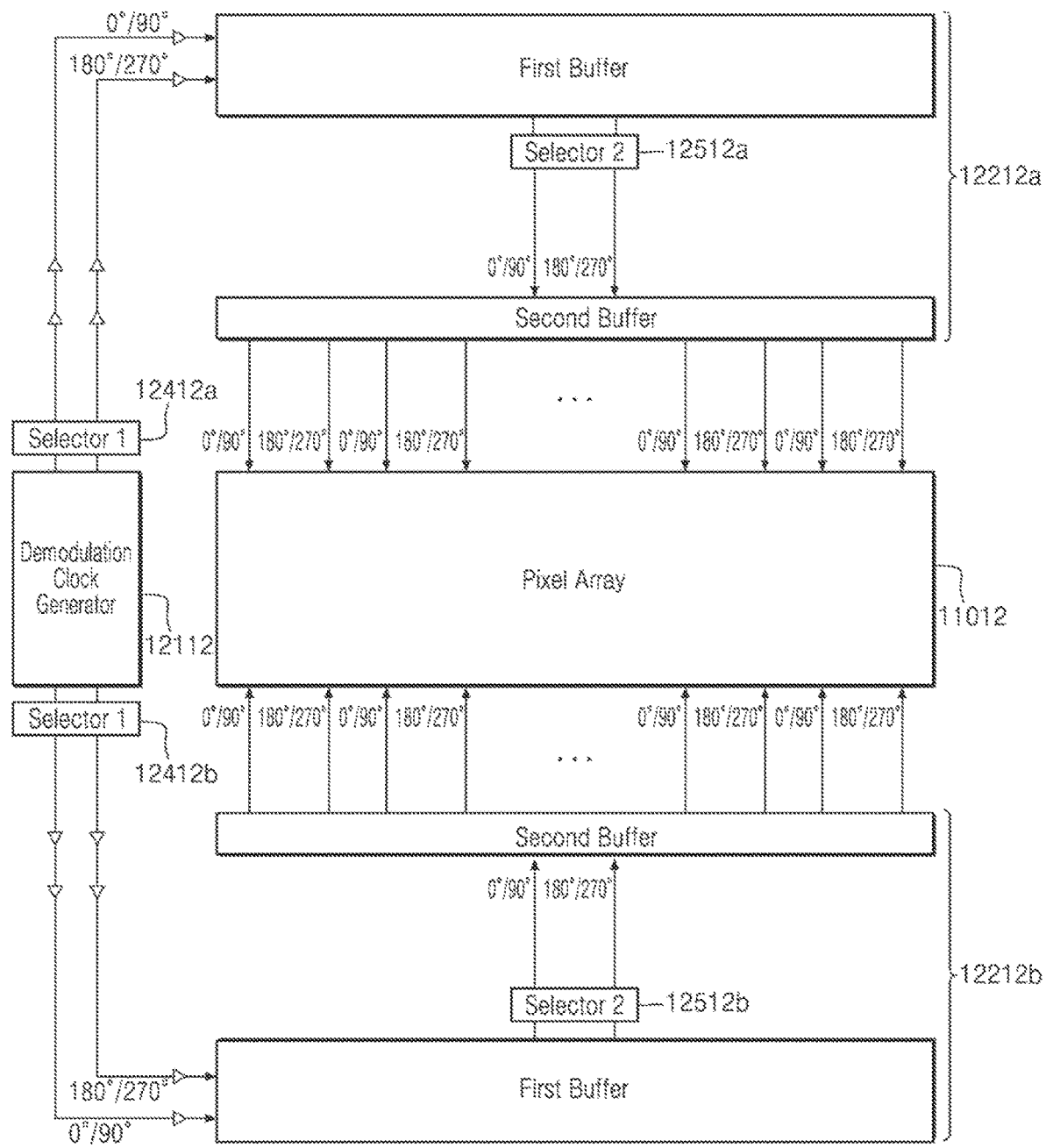
Figure 9F:
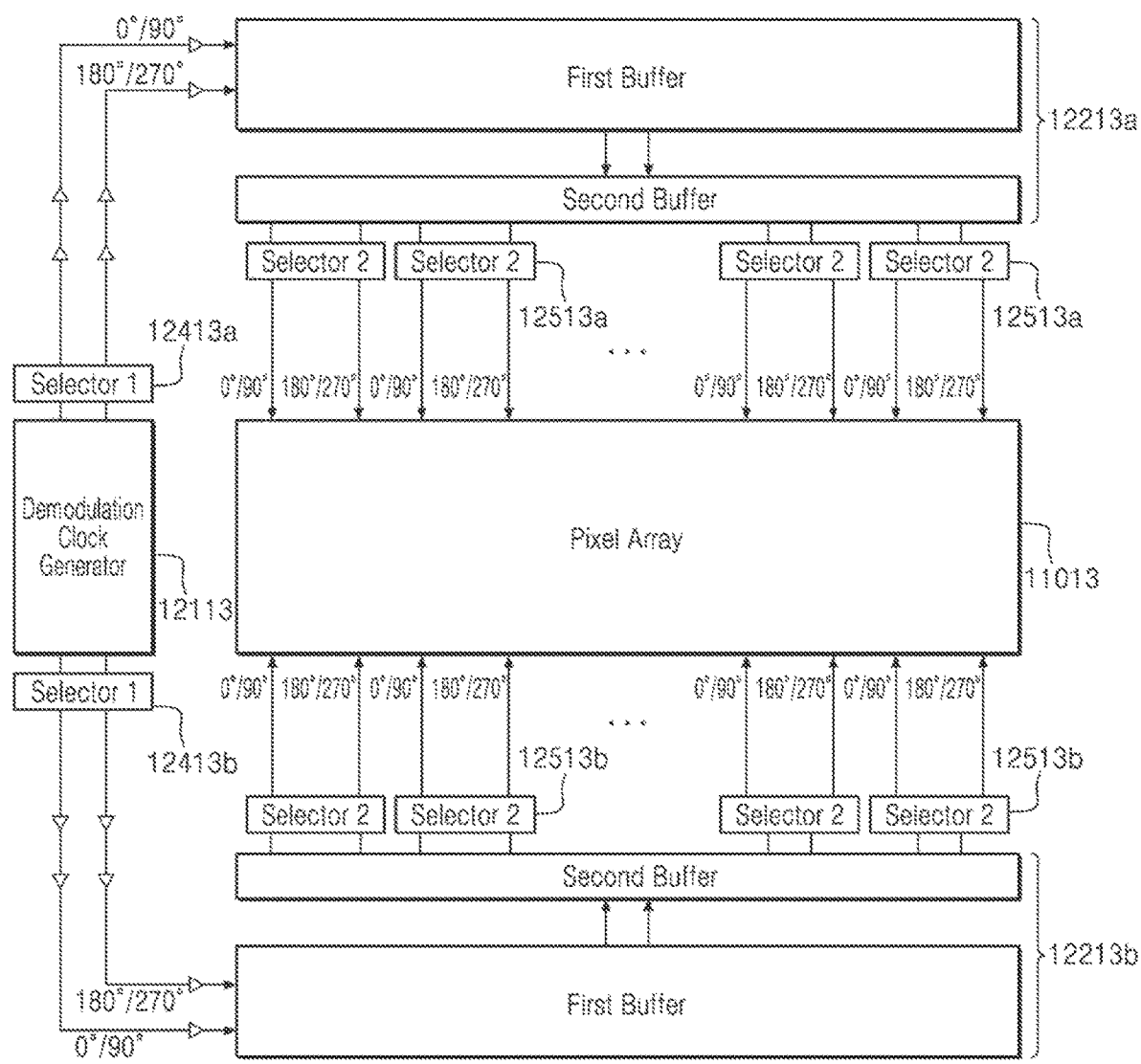

Referring to FIGS. 9D to 9E, an example of an image sensor in which buffer circuits are respectively provided in the upper and lower directions of the pixel array is shown. FIG. 9D is an example in which buffer circuits 12211a and 12211b are provided in the upper and lower directions of a pixel array 11011, respectively. Accordingly, two first selection circuits 12411a and 12411b and two second selection circuits 12511a and 12511b may be provided. FIG. 9E is an example in which buffer circuits 12212a and 12212b are provided in the upper and lower directions of a pixel array 11012, respectively. Accordingly, two first selection circuits 12412a and 12412b and two second selection circuits 12512a and 12512b may be provided. FIG. 9F is an example in which buffer circuits 12213a and 12213b are provided in the upper and lower directions of a pixel array 11013, respectively. Accordingly, two first selection circuits 12413a and 12413b and a plurality of second selection circuits 12513a and 12513b may be provided.

According to an example embodiment, in a distance sensor using unit pixels using two or more taps, errors in duty cycles and phases of demodulation clock signals may be removed.

According to an example, in the case of the 4-tap method, a switching operation may be performed in a multiple of 4 using all four phase demodulation signals in one frame. Only an example embodiment in which the integration time of a 4-tap unit pixel is divided into four equal sections is shown, but the integration time may be divided into sections corresponding to multiples of 4.

According to an example, in the case of the 2-tap method, a switching operation may be performed by a multiple of 2 by dividing and using two phase demodulation signals in one frame. Only an example embodiment in which the integration time of a 2-tap unit pixel is divided into two equal sections is shown, but the integration time may be divided into a number of sections corresponding to a multiple of 2.

Example embodiments are not limited to such an example, and when the mismatch in the signal line path is biased to either side, the section may be set differently or the time of the section may be adjusted.

According to example embodiments, it is possible to remove motion lagging, which is a disadvantage of the shuffle method in which mismatching of taps is reduced by shooting 2 frames. According to an example, a depth map without motion artifacts may be implemented. According to example embodiments, mismatching caused by errors caused by different parasitic values and transistor mismatches in each signal line may be minimized. According to example embodiments, a one-shot depth map that does not require a shuffle frame may be implemented by improving mismatching of phases and duty cycles between demodulation signals.

While aspects of example embodiments have been particularly shown and described, it will be understood that various changes in form and details may be made therein without departing from the spirit and scope of the following claims.

What is claimed is:
1. An image sensor comprising:
    a demodulation clock generation circuit configured to generate M demodulation clock signals having N phases;
    a buffer circuit comprising M signal lines configured to transfer each of the M demodulation clock signals; and
    a pixel array comprising a plurality of pixels, wherein a pixel of the plurality of pixels has M taps and is configured to receive M demodulation signals passing through the M signal lines as inputs,
    wherein each of the M demodulation signals is conducted by each of the M signal lines during an integration time of one frame of the pixel, and
    wherein M and N are integers greater than or equal to 2.
2. The image sensor of claim 1, wherein the integration time comprises at least M equal time sections, and
    wherein in each of the M equal time sections, any one of the M signal lines is connected to any one of the M demodulation clock signals.
3. The image sensor of claim 1, wherein the integration time comprises at least M equal time sections,
    wherein in each of the M equal time sections, any one of the M signal lines is connected to any one of the M demodulation signals, and
    wherein the M demodulation signals are connected to each of the M taps having corresponding phases.
4. The image sensor of claim 1, further comprising:
    a first selection circuit provided between the demodulation clock generation circuit and the buffer circuit; and
    a second selection circuit provided between the buffer circuit and the pixel array.
5. The image sensor of claim 4, wherein the first selection circuit comprises a plurality of first selection switches connected to at least one demodulation clock signal of the M demodulation clock signals and to each of the M signal lines.
6. The image sensor of claim 4, wherein the second selection circuit comprises a plurality of second selection switches connected to at least one output terminal of each of the M signal lines and to each of the M taps of the pixel.
7. The image sensor of claim 4, wherein the integration time comprises at least M equal time sections, and
    wherein the image sensor further comprises a switch controller configured to control a plurality of switches provided in the first selection circuit and the second selection circuit to turn on and off for each of the at least M equal time sections.
8. The image sensor of claim 7, wherein the switch controller is configured to control the plurality of switches provided in the first selection circuit and the second selection circuit so that a demodulation clock signal and a demodulation signal having a phase corresponding to the phase of the demodulation clock signal are connected to different signal lines for each of the at least M equal time sections.

9. The image sensor of claim 1, wherein the buffer circuit further comprises:
a first buffer;
a second buffer;
a first selection circuit provided between the demodulation clock generation circuit and the first buffer; and
a second selection circuit provided between the first buffer and the second buffer.

10. The image sensor of claim 1, wherein the buffer circuit further comprises:
a first buffer;
a second buffer;
a first selection circuit provided between the demodulation clock generation circuit and the first buffer; and
a second selection circuit provided between the second buffer and the pixel array.

11. An image sensor comprising:
a demodulation clock generation circuit configured to generate a first demodulation clock signal having a first phase, a second demodulation clock signal having a second phase, a third demodulation clock signal having a third phase, and a fourth demodulation clock signal having a fourth phase;
a buffer circuit comprising a first signal line, a second signal line, a third signal line, and a fourth signal line configured to transfer the first demodulation clock signal, the second demodulation clock signal, the third demodulation clock signal, and the fourth demodulation clock signal; and
a pixel array comprising a plurality of pixels configured to receive a first tap signal, a second tap signal, a third tap signal, and a fourth tap signal passing through the first to fourth signal lines as inputs of a pixel, among the plurality of pixels, having four taps,
wherein an integration time of one frame comprises a first section, a second section, a third section and a fourth section, and
wherein the first tap signal passes through the first signal line in the first section, the second signal line in the second section, the third signal line in the third section, and the fourth signal line in the fourth section.

12. The image sensor of claim 11, wherein the first section, the second section, the third section, and the fourth section have a common time length.

13. The image sensor of claim 11, further comprising:
a first selection circuit provided between the demodulation clock generation circuit and the buffer circuit; and
a second selection circuit provided between the buffer circuit and the pixel array.

14. The image sensor of claim 13, wherein the first selection circuit comprises a first signal line switch group, a second signal line switch group, a third signal line switch group, and a fourth signal line switch group, and
wherein the first signal line switch group comprises:
a first switch connected between the first signal line and the first demodulation clock signal;
a second switch connected between the first signal line and the second demodulation clock signal;
a third switch connected between the first signal line and the third demodulation clock signal; and
a fourth switch connected between the first signal line and the fourth demodulation clock signal.

15. The image sensor of claim 14, wherein the second selection circuit comprises a first tap switch group, a second tap switch group, a third tap switch group, and a fourth tap switch group, and
wherein the first tap switch group comprises:
a first tap switch connected between a first tap of the pixel and the first signal line;
a second tap switch connected between the first tap and the second signal line;
a third tap switch connected between the first tap and the third signal line; and
a fourth tap switch connected between the first tap and the fourth signal line.

16. The image sensor of claim 15, further comprising a switch controller configured to control switches provided in the first selection circuit and the second selection circuit,
wherein the switch controller is configured to control whether a plurality of switches provided in the first signal line switch group and the first tap switch group are turned on in each of the first section, the second section, the third section, and the fourth section.

17. A camera module comprising:
a light source configured to transmit a light signal to an object; and
an image sensor configured to receive the light signal reflected from the object,
wherein the image sensor comprises:
a demodulation clock generation circuit configured to generate M demodulation clock signals having N phases;
a buffer circuit comprising M signal lines configured to transfer each of the M demodulation clock signals; and
a pixel array comprising a plurality of pixels, wherein a pixel of the plurality of pixels has M taps and is configured to receive M demodulation signals passing through the M signal lines as inputs,
wherein each of the M demodulation signals is conducted by each of the M signal lines during an integration time of one frame of the pixel, and
wherein M and N are integers greater than or equal to 2.

18. The camera module of claim 17, wherein the integration time comprises at least M equal time sections, and
wherein a number of the at least M equal time sections corresponds to a multiple of M.

19. The camera module of claim 18, wherein the image sensor further comprises:
a first selection circuit provided between the demodulation clock generation circuit and the buffer circuit; and
a second selection circuit provided between the buffer circuit and the pixel array.

20. The camera module of claim 19, wherein the image sensor further comprises a switch controller configured to control switches provided in the first selection circuit and the second selection circuit to turn on and off for each of the at least M equal time sections, and
wherein the switch controller is configured to control a plurality of switches provided in the first selection circuit and the second selection circuit so that a demodulation clock signal and a demodulation signal having a phase corresponding to the phase of the demodulation clock signal are connected to different signal lines for each of the at least M equal time sections.

* * * * *